United States Patent
Kageyama et al.

(10) Patent No.: US 7,400,420 B2
(45) Date of Patent: Jul. 15, 2008

(54) PRINTER FACILITATING SETTINGS OF PARAMETERS ON PRINT PAPER

(75) Inventors: Seiji Kageyama, Hitachinaka (JP);
Susumu Hashimoto, Hitachinaka (JP);
Muneyoshi Akai, Hitachinaka (JP);
Shinichi Kishi, Hitachinaka (JP);
Hiroshi Udo, Hitachinaka (JP);
Toshihiko Takenouchi, Hitachinaka (JP)

(73) Assignee: Ricoh Printing Systems, Ltd. (JP)

( * ) Notice: Subject to any disclaimer, the term of this patent is extended or adjusted under 35 U.S.C. 154(b) by 946 days.

(21) Appl. No.: 10/412,695

(22) Filed: Apr. 14, 2003

(65) Prior Publication Data

US 2003/0234949 A1 Dec. 25, 2003

(30) Foreign Application Priority Data

Apr. 12, 2002 (JP) ............... P2002-110723
Oct. 18, 2002 (JP) ............... P2002-304354

(51) Int. Cl.
*G06F 15/00* (2006.01)
*G06F 3/12* (2006.01)

(52) U.S. Cl. ............... 358/1.13; 358/1.1; 358/1.9; 358/1.15

(58) Field of Classification Search ............ 358/1.13, 358/1.1, 1.9, 1.15
See application file for complete search history.

(56) References Cited

U.S. PATENT DOCUMENTS 6,385,348 B1 * 5/2002 Harada ............... 382/284
6,552,814 B2 4/2003 Okimoto et al.
6,897,974 B1 * 5/2005 Coker ............... 358/1.15

FOREIGN PATENT DOCUMENTS

| DE | 692 26 410 T2 | 12/1998 |
|---|---|---|
| DE | 694 16 480 T2 | 9/1999 |
| EP | 0 921 010 A2 | 6/1999 |
| JP | 6-91989 | 4/1994 |
| JP | 7-108678 | 4/1995 |
| JP | 7-125390 | 5/1995 |
| JP | 8-142441 | 6/1996 |
| JP | 10-109444 | 4/1998 |
| JP | 11-119953 | 4/1999 |
| JP | 11-143668 | 5/1999 |
| JP | 11-235856 | 8/1999 |
| JP | 2000-181667 | 6/2000 |
| JP | 2001-43050 | 2/2001 |

OTHER PUBLICATIONS

German Office Action dated Aug. 13, 2004.
Foreign Office Action issued Apr. 6, 2007 to Japanese Patent Application No. 2002-304354, with copy of English Translation.
Japanese Office Action with English Translation dated Jul. 11, 2007.

* cited by examiner

*Primary Examiner*—Thomas D Lee

(57) ABSTRACT

A printer provided with a printer controller and a printer engine, wherein the printer controller includes a user interface control unit with a function for grouping together parameters associated with the paper, overlay and so on and recording this group of parameters under a desired name.

15 Claims, 22 Drawing Sheets

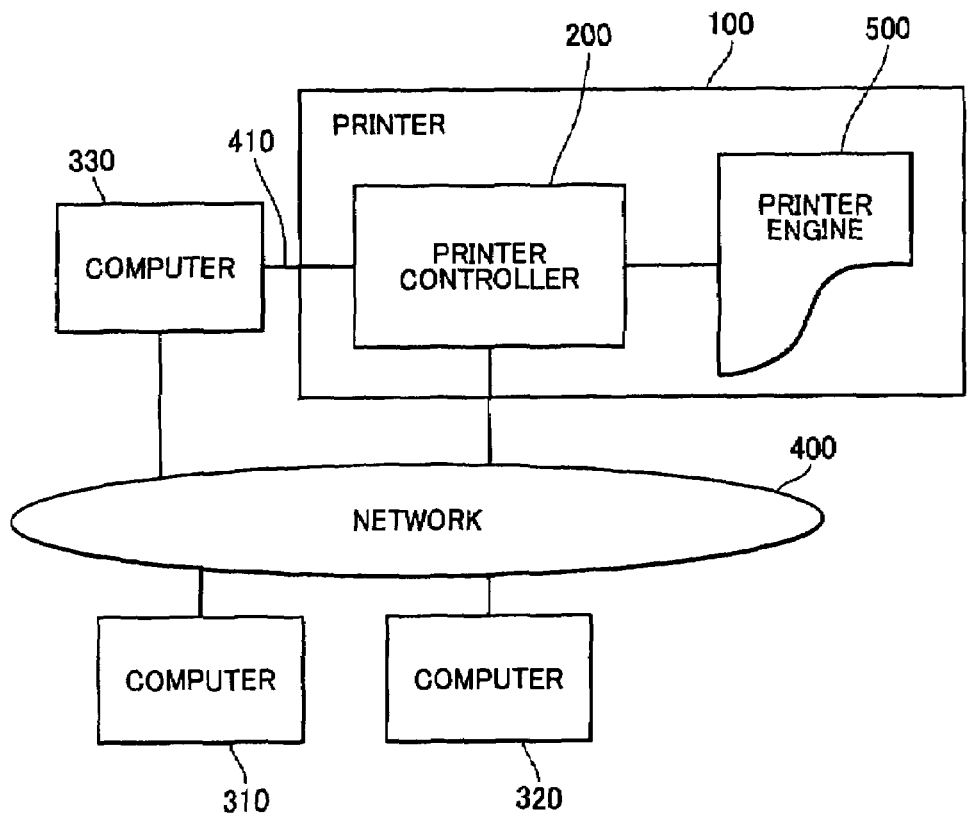
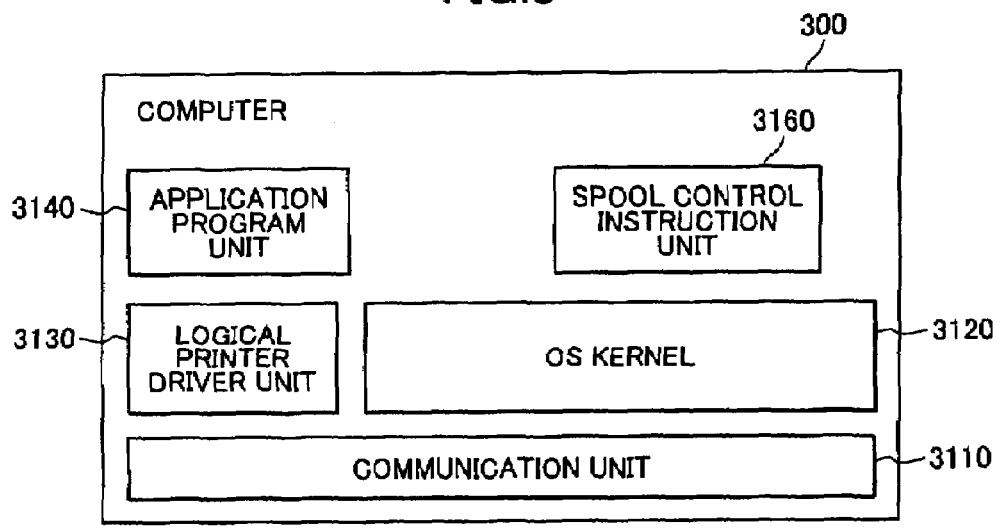

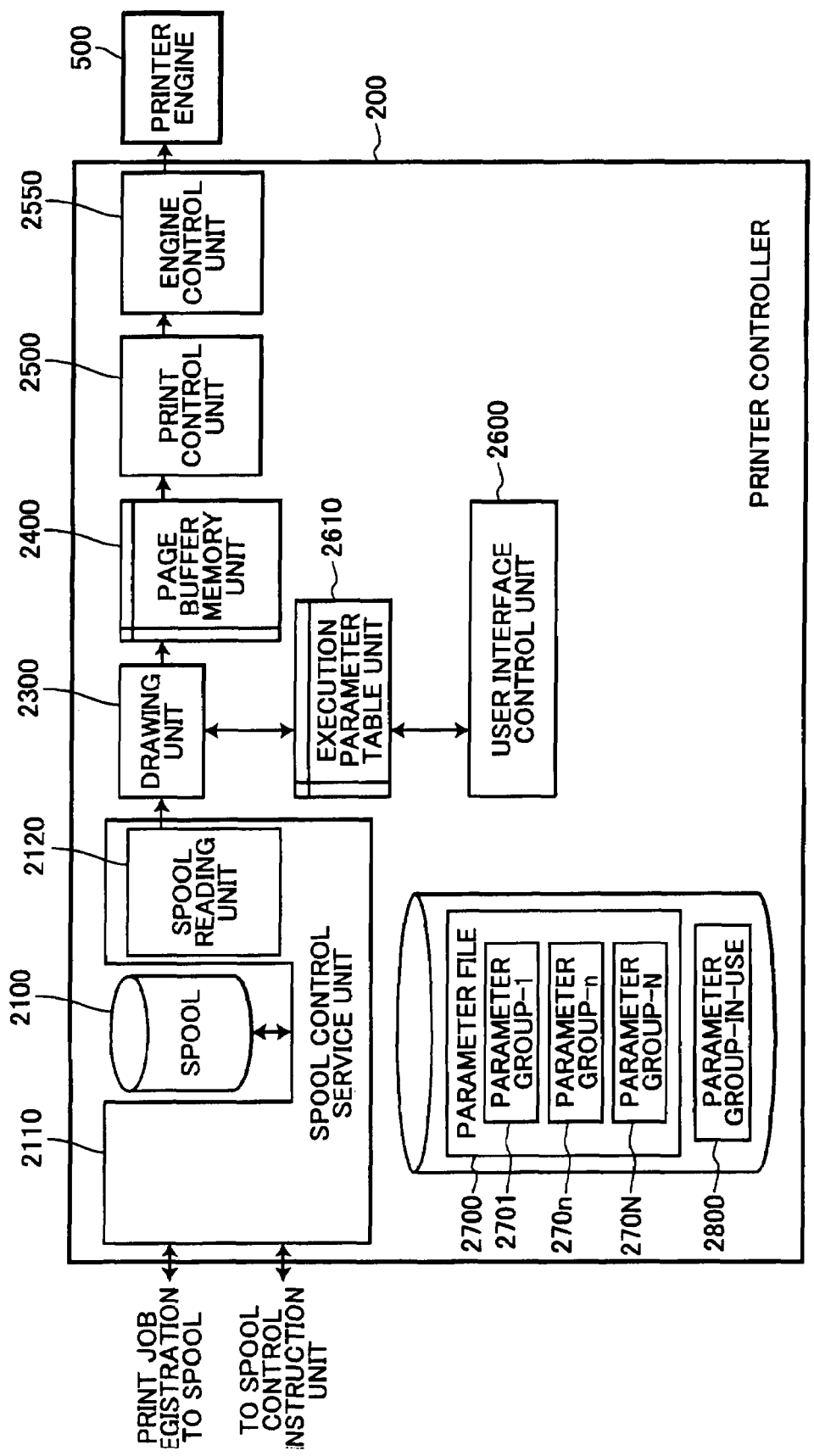

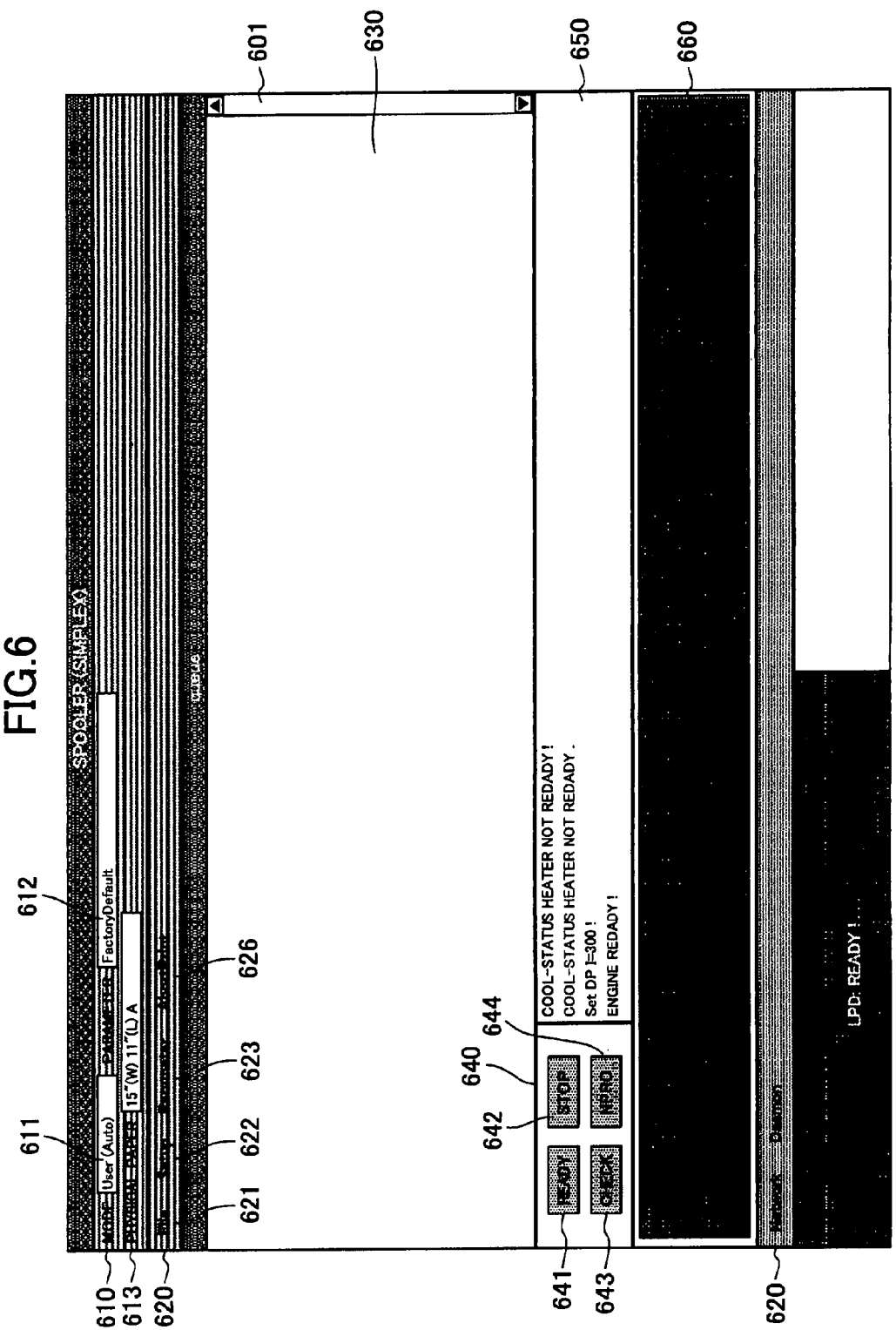

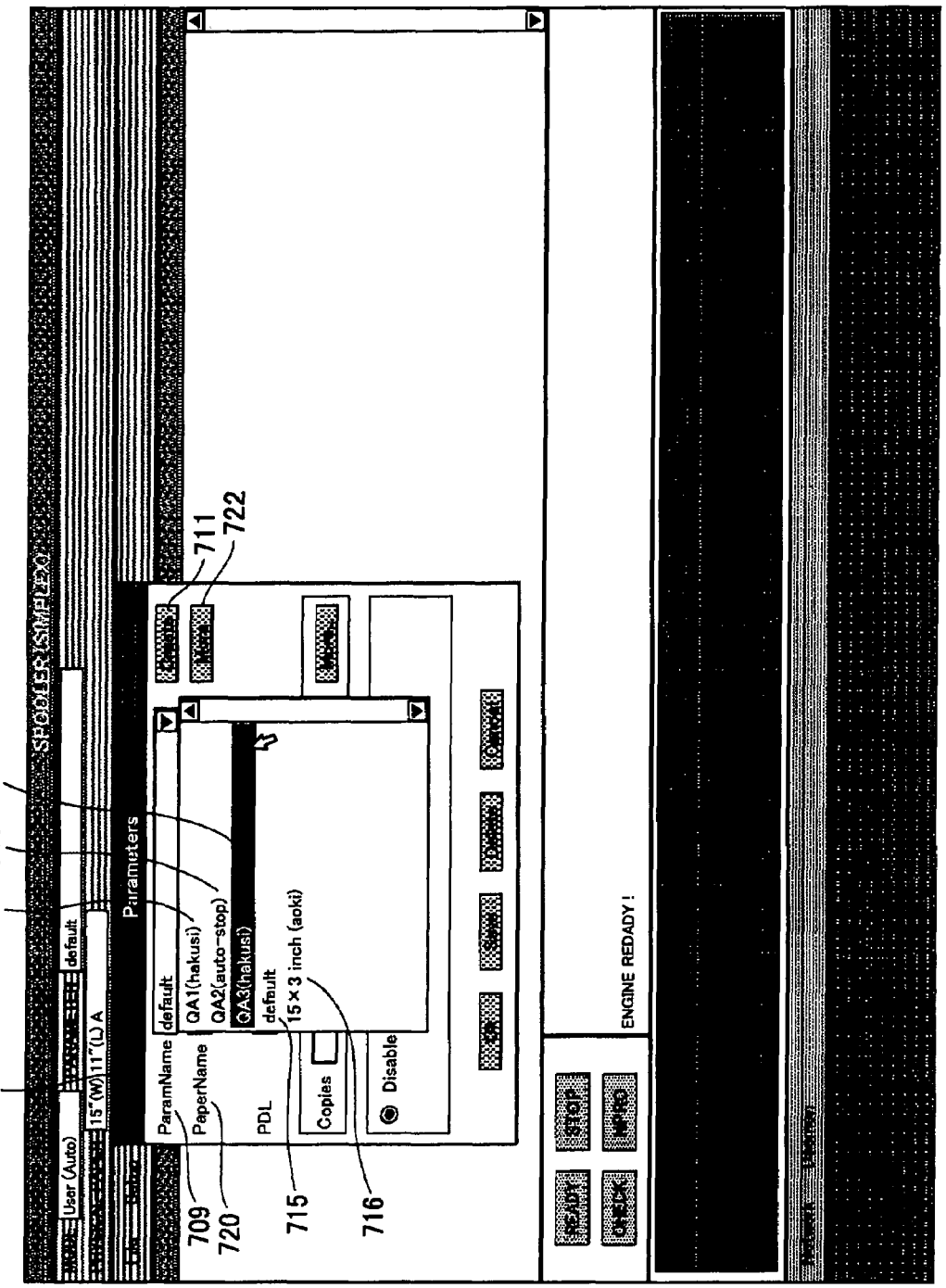

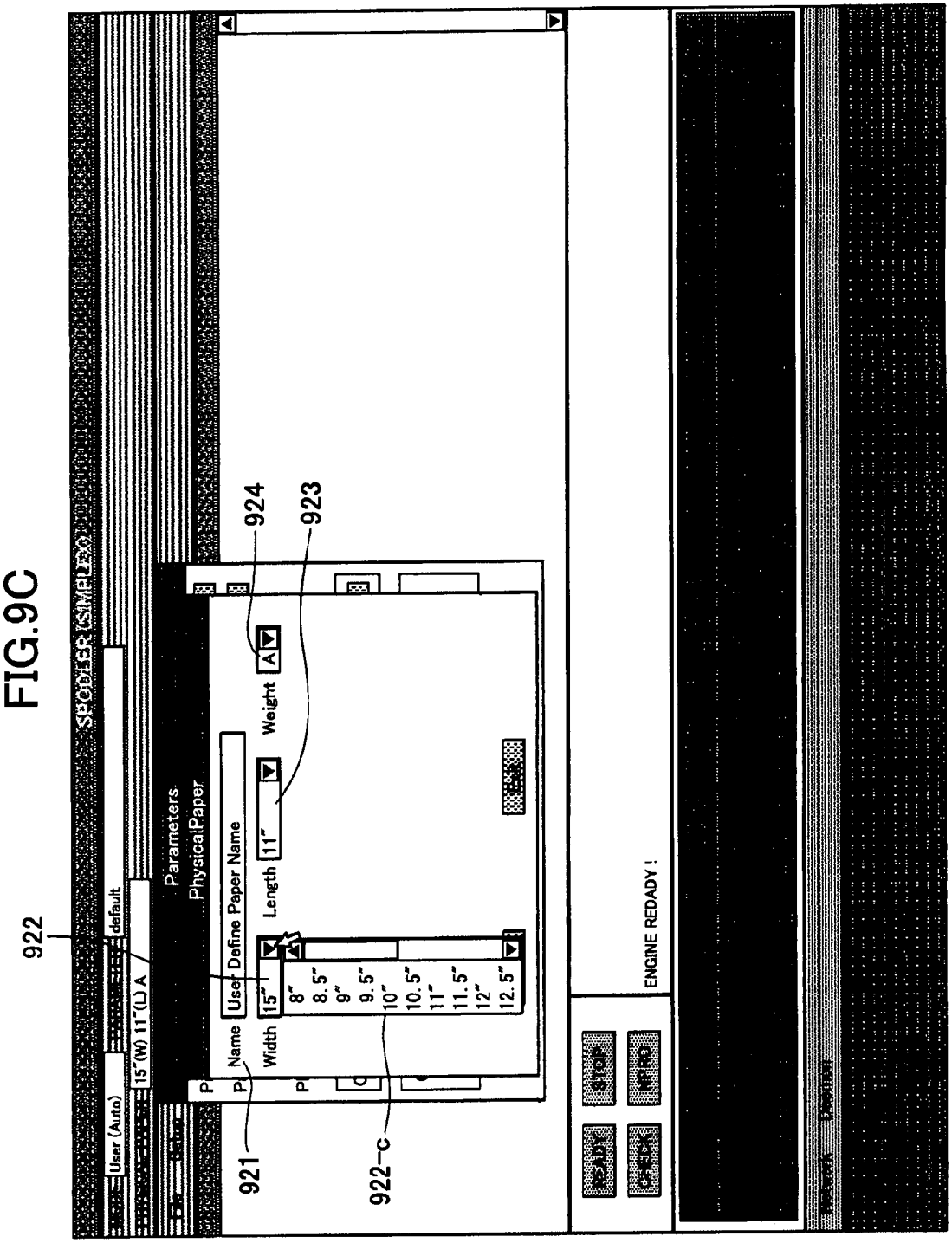

PROCESS EXECUTED BY THE DRAWING UNIT

PROCESS EXECUTED BY THE PRINT CONTROL UNIT

INPUT INTERRUPT PROCESS EXECUTED BY THE USER INTERFACE CONTROL UNIT

ENGINE INTERRUPT PROCESS EXECUTED BY THE ENGINE CONTROL UNIT

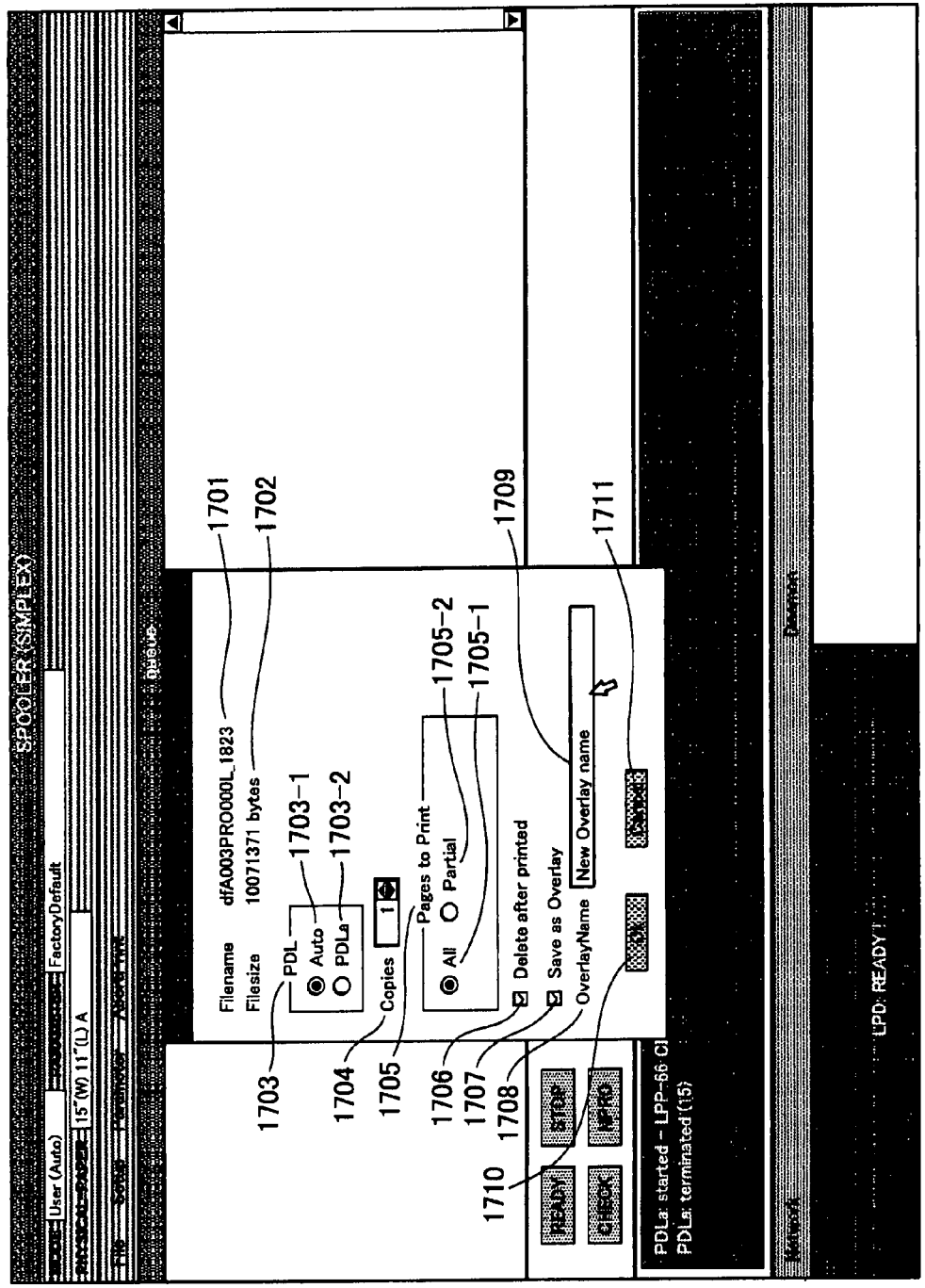

FIG.18A
COPIES: 4 ~18a1
CYCLE: 5 ~18a2
OVERLAY DEFINITION: Overlay1, Overlay3, Overlay4, Not Used, Overlay5
  \\18a3   \\18a3-1 \\18a3-2 \\18a3-3 \\18a3-4 \\18a3-5
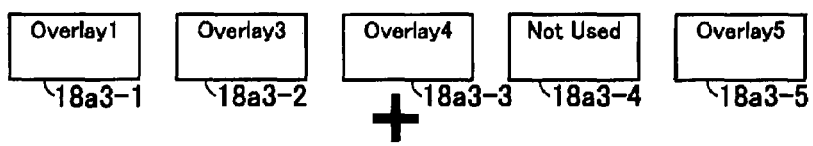
PRINT JOB: Page(1), Page(2), Page(3), Page(4), Page(5), Page(6)
  \\18a4   \\18a4-1 \\18a4-2 \\18a4-3 \\18a4-4 \\18a4-5 \\18a4-6
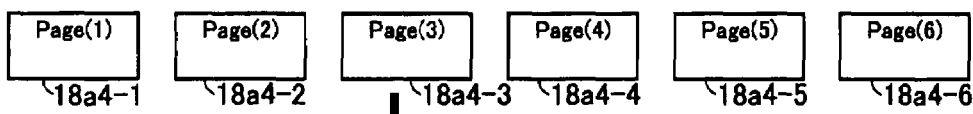
PRINT RESULT: Page(1)+Overlay1, Page(2)+Overlay3, Page(3)+Overlay4, Page(4),
  \\18a5        \\18a5-1              \\18a5-2              \\18a5-3        \\18a5-4
        Page(5)+Overlay5, Page(6)+Overlay1
              \\18a5-5           \\18a5-6
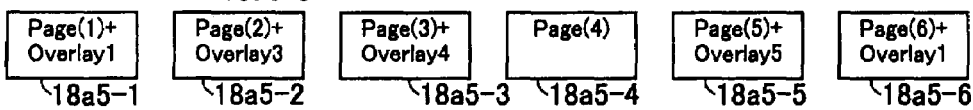

FIG. 18B

COPIES: 4 ~18b1
CYCLE: 5 ~18b2
OVERLAY DEFINITION: Overlay1, Overlay3, Overlay4, Not Used, Overlay5
~18b3  ~18b3-1 ~18b3-2 ~18b3-3 ~18b3-4 ~18b3-5

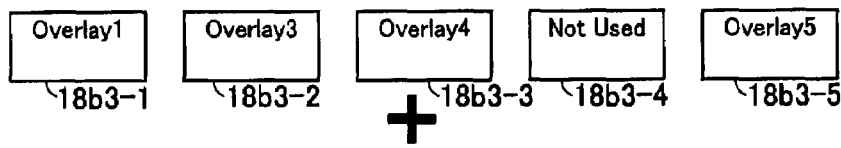

PRINT JOB: Page(1), Page(2), Page(3), Page(4), Page(5), Page(6)
~18b4  ~18b4-1 ~18b4-2 ~18b4-3 ~18b4-4 ~18b4-5 ~18b4-6

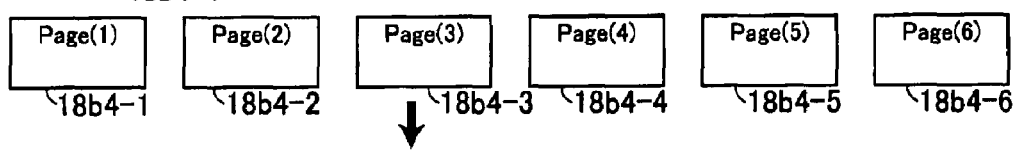

PRINT RESULT: Page(1)+Overlay1, Page(1)+Overlay3, Page(1)+Overlay4, Page(1),
~18b5  ~18b5-1  ~18b5-2  ~18b5-3  ~18b5-4
Page(2)+Overlay5, Page(2)+Overlay1, Page(2)+Overlay3, Page(2)+Overlay4,
~18b5-5  ~18b5-6  ~18b5-7  ~18b5-8
Page(3),  Page(3)+Overlay5, Page(3)+Overlay1, Page(3)+Overlay3,
~18b5-9  ~18b5-10  ~18b5-11  ~18b5-12
Page(4)+Overlay4, Page(4),  Page(4)+Overlay5, Page(4)+Overlay1,
~18b5-13 ~18b5-14  ~18b5-15  ~18b5-16
Page(5)+Overlay3, Page(5)+Overlay4, Page(5),  Page(5)+Overlay5,
~18b5-17 ~18b5-18 ~18b5-19  ~18b5-20
Page(6)+Overlay1, Page(6)+Overlay3, Page(6)+Overlay4, Page(6)
~18b5-21  ~18b5-22  ~18b5-23  ~18b5-24

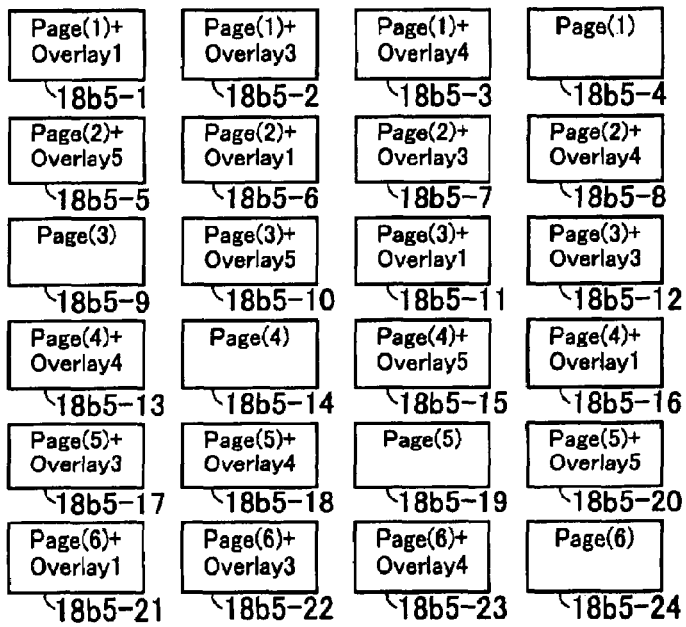

PRINTER FACILITATING SETTINGS OF PARAMETERS ON PRINT PAPER

BACKGROUND OF THE INVENTION

1. Field of the Invention

The present invention relates to a printer used in combination with a computer, such as a personal computer or workstation.

2. Description of the Related Art

Conventionally, there have been printers such as the Hitachi Laser Printer HT-4559 702/705 and the like that enable a user operating a control panel to set printing parameters, such as a printing position, paper weight, and the like.

However, while conventional printers can enable a user operating a control panel to set the various parameters described above, these printers cannot record such parameters for each printing operation or print job. Hence, when a user transmits different print operations or job data to the printer to be printed, the user must operate the control panel each time to reset all of the plurality of parameters, entailing a complex operation of confirming the values.

SUMMARY OF THE INVENTION

In view of the foregoing, it is an object of the present invention to provide a printer capable of performing efficient printing operations with user-friendly operations.

These objects and others will be attained by a printer according to the present invention that is provided with a printer controller and a printer engine. The printer controller includes a user interface control unit having a function for grouping together parameters associated with the paper and recording this group of parameters under a desired name.

According to another aspect of the present invention, a printer is provided with a printer controller and a printer engine. The printer controller includes a user interface control unit with a function for grouping together parameters related to overlay printing and recording this group of parameters under a desired overlay name.

The printer according to the present invention is further provided with a function for recording a parameter group that includes a PDL identification mode, parameters for each type of PDL, and the paper name under a desired parameter name.

According to another aspect of the present invention, a printer is provided with a printer controller and a printer engine. The printer controller includes a user interface control unit with a function for grouping together parameters associated with paper and recording this group of parameters in the printer controller under a desired paper name and for grouping together parameters related to overlay printing and recording this group of parameters in the printer controller under a desired overlay name.

According to another aspect of the present invention, a printer is provided with a printer controller and a printer engine. The printer controller includes a user interface control unit. A parameter group having a group of parameters including a paper name for storing parameters associated with paper together, an overlay name for storing parameters associated with overlay printing together, a PDL identification mode and parameters for each PDL, is stored under a desired parameter name.

The group of parameters associated with the paper includes a paper size, paper thickness, and fixing temperature.

Further, a user can select one of the recorded parameter groups by specifying a pre-recorded parameter name in order to set all of the parameters in the printer controller.

Common parameters independent of PDL can be added to the parameter group. The common parameters that can be added to the parameter group include a number of print copies, a rotational angle, and an N-up parameter. The N-up parameter means that when N is equal to 2, two pages are placed next to each other on a single output page, and when N is equal to 3, three pages are placed next to each other on a single output page.

BRIEF DESCRIPTION OF THE DRAWINGS

The particular features and advantages of the invention as well as other objects will become apparent from the following description taken in connection with the accompanying drawings, in which:

FIG. 1 is a block diagram showing the overall construction of a printing system;

FIG. 2 is a block diagram showing the construction of a printer controller;

FIG. 3 is a block diagram showing the construction of a computer;

FIG. 6 is an explanatory diagram showing the user interface of the printer controller;

FIGS. 7A And 7B are explanatory diagrams showing the user interface of the printer controller;

FIGS. 9A through 9C are explanatory diagrams showing the user interface of the printer controller;

FIG. 17 is an explanatory diagram showing overlay control; and

FIGS. 18A and 18B are explanatory diagrams showing overlay control.

DESCRIPTION OF THE PREFERRED EMBODIMENTS

Figure 4:
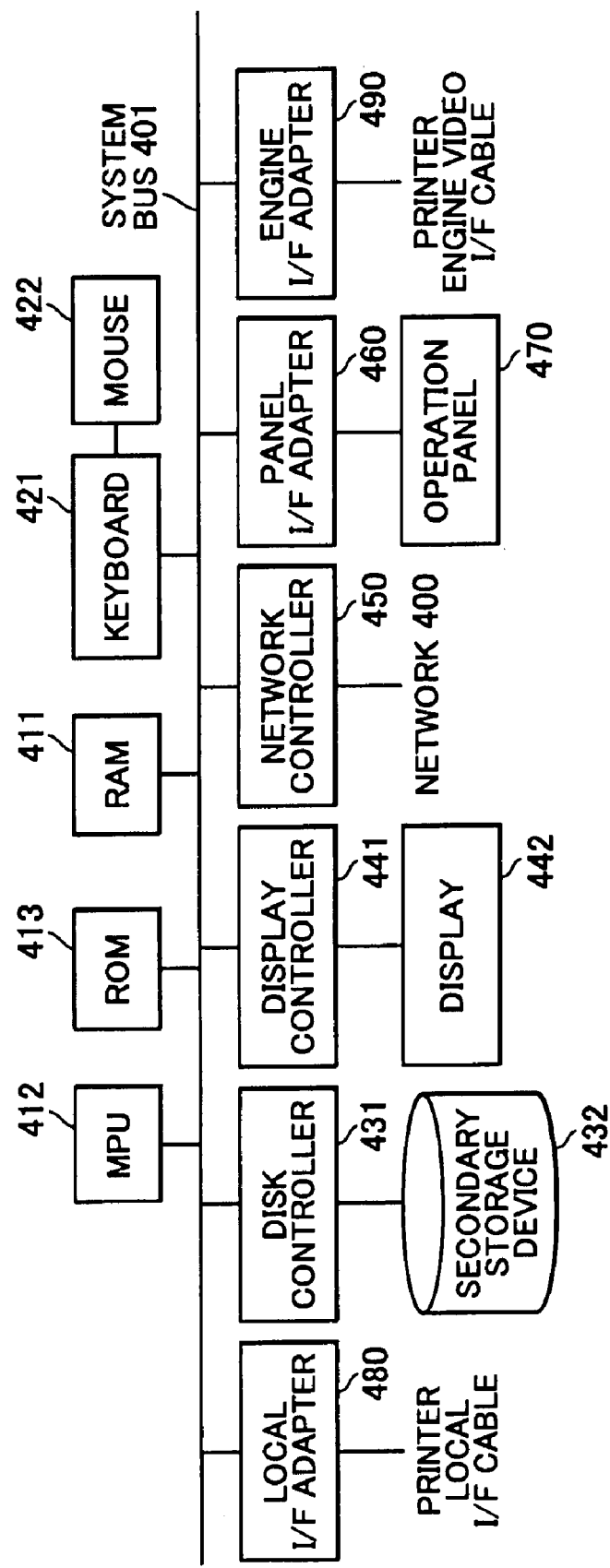
FIG. 4 is a block diagram showing the hardware construction of the printer controller.

A printer according to a preferred embodiment of the present invention will be described while referring to the accompanying drawings. First the overall construction of a printing system will be described with reference to FIG. 1.

A printing system includes a network 400, a plurality of computers 310, 320, and 330, and a printer 100. The computers 310, 320, and 330 are connected to the printer 100 via the network 400. The printer 100 includes a printer controller 200 and a printer engine 500.

The controller 200 receives a print command sequence, called a PDL (Page Description Language) document, from one of the computers 310, 320, and 330; processes the sequence of data; and transmits image data to the printer engine 500. The printer engine 500 receives the image data and prints images based on the data on paper using a printing mechanism. Here, the printing mechanism can be of any type known in the art, such as an electrophotographic printing system that uses a laser, LED, or liquid-crystal shutter or the like to expose image carrying light to a photosensitive drum or other photosensitive member; an inkjet printing system; a shuttle impact printing system; or the like.

The following embodiment is a description for a page printer using the electrophotographic printing system. The same effects can be achieved when using an inkjet or other printing system or when using a line printer system that prints in units of lines.

The following description mainly applies to a continuous paper printer for printing on elongated web-like paper (i.e. continuous paper). However, the same effects can be achieved with a cut paper printer that prints on cut sheets of paper.

The printer 100 receives PDL documents from the computers 310, 320, and 330 and performs printing of the PDL document according to instructions from the computers 310, 320, and 330. A detailed description of this process is given later.

Next, the construction of the computers 310, 320, and 330 will be described with reference to FIG. 3. For convenience, the construction of each of the computers 310, 320, and 330 in the present embodiment are assumed to be identical to the construction of a computer 300 shown in FIG. 3.

The computer 300 includes a communication unit 3110, an OS kernel 3120, a logical printer driver unit 3130, an application program unit 3140, and a spool control instruction unit 3160. The communication unit 3110 is configured in hardware and software and enables the computer 300 to communicate with various devices, such as computers and printers, via the network 400.

The OS kernel 3120 is basic software called an operating system for controlling hardware components of the computer 300, a user interface, and the like. While the communication unit 3110 is sometimes considered a part of the OS kernel 3120, the communication unit 3110 will be treated as a separate element in the present embodiment.

The application program unit 3140 includes programs for performing word processing or document layout, or for creating spreadsheets, graphics documents, and image documents. The application program unit 3140 creates each type of document and instructs the logical printer driver unit 3130 to perform processes on the generated document.

The logical printer driver unit 3130 converts the document created by the application program unit 3140 into the PDL format and transmits this PDL document to the controller 200 shown in FIG. 1. Here, the term "emulation" can be used instead of PDL.

The computer 300 transmits the PDL document via the OS kernel 3120 and communication unit 3110 to the printer controller 200. The computer 300 and printer controller 200 are connected using either a printer local interface 410, shown in FIG. 1, or the network 400, both of which have the same basic functions.

Examples of PDL formats are PostScript (registered trademark) and Portable Document Format (PDF; registered trademark) developed by Adobe Systems Incorporated of the U.S.; Tag Image File Format (TIFF, registered trademark) developed by Aldus Corporation and Microsoft Corporation of the U.S.; PCL-5, PCL-5E, PCL-6, and PCL-XL (registered trademarks) developed by Hewlett Packard of the U.S.; and Joint Photographic Expert Group (JPEG). The present invention can support any one or more of these PDL formats.

The spool control instruction unit 3160 instructs a spool control service unit 2110 of the printer controller 200 to control the print waiting order for print jobs on a spool, check on the occurrence of failures, indicate the description of the failures, change the print job order, and the deletion of print jobs.

Next, the processing units in the controller 200 will be described with reference to FIG. 2. As shown in FIG. 2, the processing units in the printer controller 200 include the spool control service unit 2110, a drawing unit 2300, a print control unit 2500, and a user interface control unit 2600. The printer controller 200 also includes a spool 2100, a page buffer memory unit 2400, a parameter file 2700, a parameter group-in-use 2800, and an execution parameter table unit 2610.

First the spool 2100 and page buffer memory unit 2400 will be described. The spool 2100 is a queue for receiving and entering various requests for printing and the like (hereinafter referred to as print requests) that the computers 310, 320, and 330 issue to the printer controller 200. Print requests issued from the computers 310, 320, and 330 for the printer controller 200 include printing requests and the like received from the application program unit 3140 via the logical printer driver unit 3130.

The printer controller 200 records these printing requests as print jobs in the spool 2100 in the order received. Here, (i) control data, such as a job name (with serial number), entry date, document size, and the like, for controlling each print job and (ii) print data that is the actual content of the document are recorded in a file. In print requests received from the application program unit 3140 via the logical printer driver unit 3130, PDL documents are used as the print data.

The spool control service unit 2110 executes the following three functions.

(1) Receives and records print jobs in the spool (2) Executes print jobs stored in the spool in the order received (3) Executes requests from the spool control instruction unit 3160 in the computers 310, 320, and 330

In item (1) described above, the controller 200 receives print requests from the application program unit 3140 via the logical printer driver unit 3130 when requests are transmitted from the computers 310, 320, and 330 to the controller 200.

In item (2) described above, a spool reading unit 2120 in the spool control service unit 2110 reads and processes print jobs in the spool 2100 in order. The spool reading unit 2120 reads and processes PDL documents from the spool 2100 that are stored as print data. When the spool control service unit 2110 supports a plurality of PDLs, either the spool reading unit 2120 or the drawing unit 2300 identifies the PDL type and executes a process corresponding to that type. The mode used for identifying the PDL is set according to the PDL mode specified by the user in a PDL pull-down list 731, a PDL pull-down list 831, or the like, to be described later with reference to FIGS. 7A and 8.

The spool reading unit 2120 in the spool control service unit 2110 reads the print jobs entered in the spool in order of reception and passes the print jobs on for printing. The spool control service unit 2110, drawing unit 2300, print control unit 2500 and user interface control unit 2600 are implemented in units called tasks or processes in the field of computer software.

An OS kernel in the controller 200 switches tasks on or off according to input and output between the printer controller 200 and external devices and the processing status in the controller 200. In this way, it is possible to improve the printing performance and to increase throughput in the printer controller 200.

When a PDL format document is inputted into the drawing unit 2300, the drawing unit 2300 performs drawing, that is, the drawing unit 2300 develops text elements, graphic elements, and images in the PDL document as a dot images and outputs this dot image to the page buffer memory unit 2400. The page buffer memory unit 2400 can store dot image data for a plurality of pages.

In a continuous paper printer, the size of the page buffer memory unit 2400 is set to the size of the paper suspended on the printer engine 500. This size is called the physical paper size because it is the actual size of the paper. The paper is called the physical paper.

On the other hand, while the drawing unit 2300 processes inputted PDL documents and outputs data in a dot image format, the paper size handled by the drawing unit 2300 is independent of the physical paper size. Hence, it is not necessary for the paper size handled by the drawing unit 2300 to be the same as the physical paper size. The paper size of data that the drawing unit 2300 creates according to the PDL document is called a logical paper size. The continuous paper printer prints documents of the logical paper size within the physical paper size. When necessary, a post-process device is provided downstream from the printer engine 500 to form a finished product of the printed material by cutting the logical paper size from the physical paper size. In this case, an N-up function described later is effective.

The print control unit 2500 directs an engine control unit 2550 to read dot image data for pages stored in the page buffer memory unit 2400 and output this data to the printer engine 500. According to these instructions, the engine control unit 2550 reads data in a dot image format for pages stored in the page buffer memory unit 2400 and outputs this data to the printer engine 500. As a result, the printer engine 500 performs a printing process for the received data.

The engine control unit 2550 controls the printer engine 500 via an engine interface adapter 490 that will be described later with reference to FIG. 4. Here, the engine control unit 2550 is implemented in the printer controller 200 as a driver program. The user interface control unit 2600 receives input from a keyboard 421, a mouse 422, and an operation panel 470 and displays the status of the printer controller 200.

The parameter file 2700 is a file for storing groups of parameters inputted by the user via the keyboard 421, mouse 422, or operation panel 470. A parameter group-1 denoted by 2701, a parameter group-n denoted by 270n, and a parameter group-N denoted by 270N are examples of individual parameter groups stored in the parameter file 2700.

The parameter group-in-use 2800 is a group of parameters currently being used that the user selected from the individual parameters groups. The user interface control unit 2600, parameter file 2700, and parameter group-in-use 2800 will be described later with reference to FIGS. 6-11.

Figure 5:
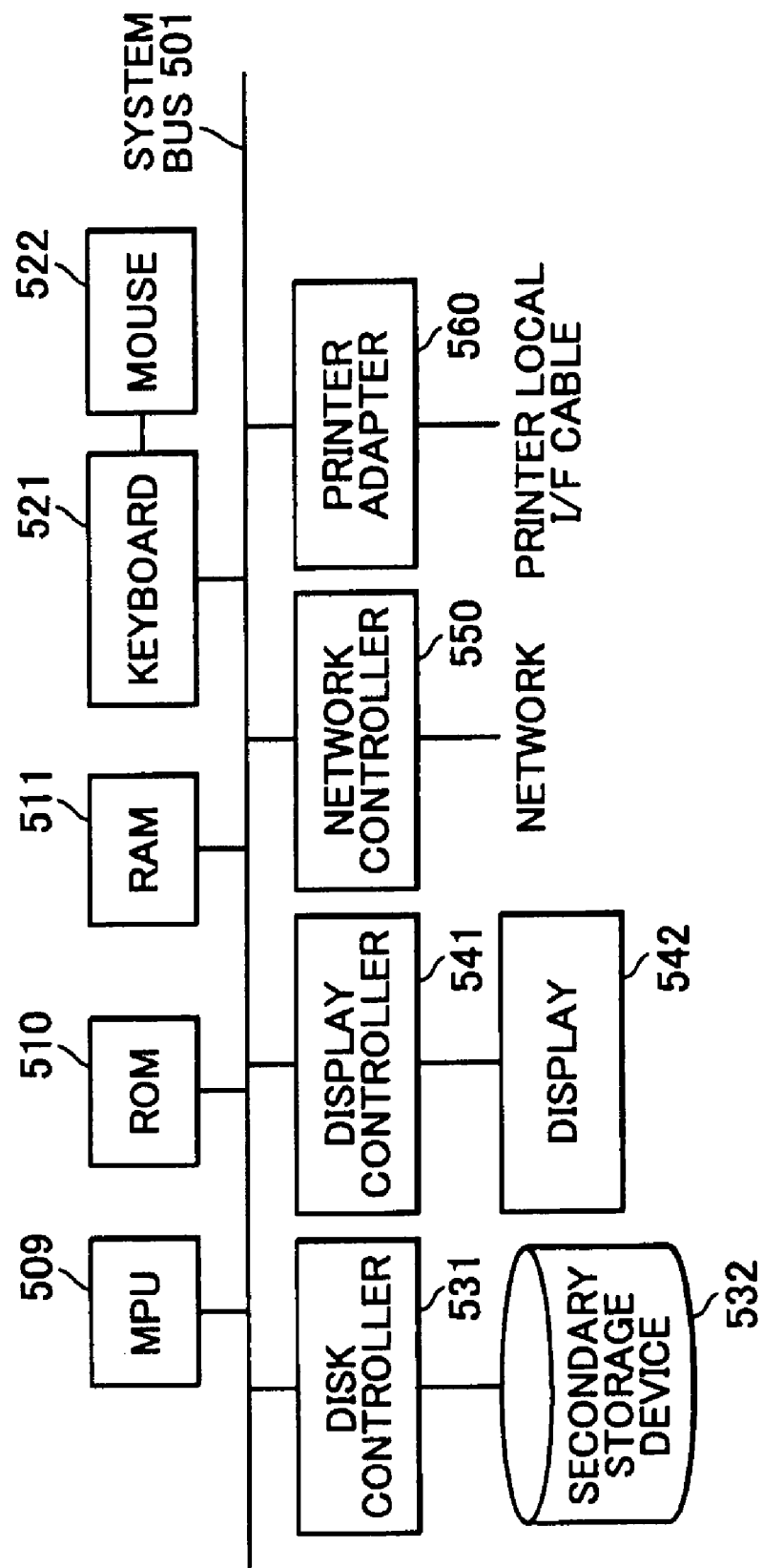
FIG. 5 is a block diagram showing the hardware construction of the computer.

Next, the hardware construction in each component of the printing system will be described with reference to FIGS. 4 and 5.

First the construction of the printer controller 200 will be described with reference to FIG. 4. The printer controller 200 includes an MPU 412, a system bus 401, a ROM 413, a RAM 411, a keyboard 421, a mouse 422, a disc controller 431, a secondary storage device 432, a display controller 441, a display 442, a network controller 450, a local interface adapter 48O, a panel interface adapter 460, an operation panel 470, and an engine interface adapter 480.

The system bus 401 conveys various input/output signals, data signals, and other control signals to and from the MPU 412. The MPU 412 performs input and output via the system bus 401 with peripheral devices, such as the keyboard 421, secondary storage device 432, display 442, and network 400, and with memory, such as the ROM 413 and RAM 411.

The keyboard 421 is an input device having a plurality of input keysets. The mouse 422 is a type of pointing device connected to the keyboard 421. The secondary storage device 432 is connected to the system bus 401 via the disc controller 431, while the display 442 is connected to the system bus 401 via the display controller 441. The system bus 401 is connected via the network controller 450 to the network 400, such as a local area network (LAN) or a wide area network (WAN).

The physical interface used by the network 400 is Ethernet (registered trademark), Token-Ring, Fiber Distributed Data Interface (FDDI), Asynchronous Transfer Mode (ATM), Integrated Services Digital Network (ISDN), or the like. Appropriate hardware logic is mounted in the network controller 450 to suit the type of physical interface used.

The local interface adapter 490 is provided for connecting the printer controller 200 directly to a computer. In this case, the printer controller 200 interfaces with a computer using Centronics, SCSI-Fiber Channel, IEEE 1394, USB, RS-232C, RS-422/423, or the like. The panel interface adapter 460 provides interface with the operation control panel 470. In this case, RS-232C, a proprietary interface, or the like is used to interface with the operation panel. The engine interface adapter 490 is provided to interface with the printer engine 500. Interface with the printer engine 500 is performed using a video interface.

The ROM 413 stores a program for initializing the controller 200 called an Initial Program Loading (IPL) program and some character fonts.

The RAM 411 stores (a) a program for controlling the printer controller, (b) the remaining character fonts, (c) various buffer memory, (d) various control tables, and other data. Of these data, (a) and (b) are loaded by the IPL program from the secondary storage device 432 into the RAM 411. The (a) and (b) can also be preloaded into the ROM 413 rather than being loaded into the RAM 411. Conversely, it is possible to load all character fonts into the RAM 411 and none into the ROM 413.

The engine interface adaptor 49O performs input/output processes with the printer engine 500 according to instructions from the MPU 412. The engine interface adapter 490 performs a process to read contents of the page buffer memory unit 2400 into the printer engine 500. This reading process is performed using a direct memory access (DMA) function built into the engine interface adapter 490.

When one page-worth of dot image data has been completely read from the pages stored in the page buffer memory unit 2400, the engine interface adapter 490 asserts an interrupt signal (part of the bus signal for the MPU 412) to MPU 412 and directs the MPU 412 to begin a read end interrupt process about the page buffer memory unit 2400.

In this read end interrupt process, a control table for the page buffer memory unit 2400 is set to indicate that the page just read is available and can be used to draw the next page. Also, the task of the drawing unit 2300, that is waiting for the availability of the page within the page buffer memory unit 2400, is released from an available condition.

The engine interface adapter 490 performs a parallel to serial conversion of the read dot image data and outputs the serial format to the printer engine 500 by transferring image signals to the printer engine 500. The engine interface adapter 490 may also transfer the image transfer signals in a parallel format without performing parallel to serial conversion.

When necessary the data can be converted from a compressed format to a noncompressed format prior to performing parallel to serial conversion.

The engine interface adapter 490 uses signals for transmitting commands and receiving status with the printer engine 500 to transmit commands for querying or instructing the printer engine 500 and receives a status in response from the printer engine 500.

Next, the hardware construction of the computer 300 will be described with reference to FIG. 5. The computer 300 includes an MPU 509, a system bus 501, a ROM 510, a RAM 511, a keyboard 521, a mouse 522, a disc controller 531, a secondary storage device 532, a display controller 541, a display 542, a network controller 550, and a printer adapter 560. All of these parts, excluding the printer adapter 560 can be configured in the same way as those in the printer controller 200.

The printer adapter 560 is used to directly connect the computer 300 to the printer controller 200 via a printer local interface cable. The interface used by the computer 300 to interface with the printer controller 200 is Centronics, SCSI/Fiber Channel, IEEE 1394, USB, RS-232C, RS-422/423, or the like.

Next, the user interface functions that the printer controller 200 provides to the user will be described with reference to FIGS. 6-11. FIG. 6 shows a main window 601 always displayed on the display 442 of the printer controller 200. Next, each element in the main window 601 will be described. A parameter status window 610 shows the parameters that are currently selected in the printer controller.

Specifically, the parameter status window 610 shows a mode space 611 for indicating the printing mode, a parameter space 612 for indicating the parameter group in-use 2800, and a physical-paper space 613 indicating the physical size of the paper in the printer.

A menu bar 620 is provided in the main window 601 to enable the user to set various directions for the printer controller 200. The menu bar 620 includes a File pull-down menu 621, a Setup pull-down menu 622, a Parameter pull-down menu 623, a Network pull-down menu 624, and a Daemon pull-down menu 625, as well as an AbortPrint button 626.

A printing queue window 630 is also provided in the main window 601. The printing queue window 630 displays the status for each print job in the spool 2100 of the printer controller 200. The status for each print job includes the number order, name, size, person who entered the print job in the spool, time entered in the spool, time at which print job completed previously. The time at which print job completed previously is indicated when the mode is set to not delete print jobs from the spool after the printing has completed.

A printer control push buttons 640 are also provided in the main window 601. More specifically, the printer control push buttons 640 include a Ready button 641, a Stop button 642, a Check button 643, and an NPRO button 644. When the user clicks the Stop button 642 through a mouse operation, the printer controller 200 shifts to a stop state. When the user clicks on the Ready button 641, the printer controller 200 shifts from a stop state to a ready state. When the user clicks on the Check button 643, the controller 200 recovers the printer engine 500 from an error status. When the user clicks on the NPRO button 644, the printer engine 500 feeds paper of a fixed length. The N-PRO function is valid only for continuous paper printers.

A printer status window 650 is also provided in the main window 601. The printer status window 650 displays the current status of the printer engine 500 and the printer controller 200.

A print job status window 660 is also provided in the main window 601. The print job status window 660 displays the status of print jobs currently being processed by the printer controller 200. For example, the print job status window 660 displays operations that the user executes for the print job.

Figure 7A:
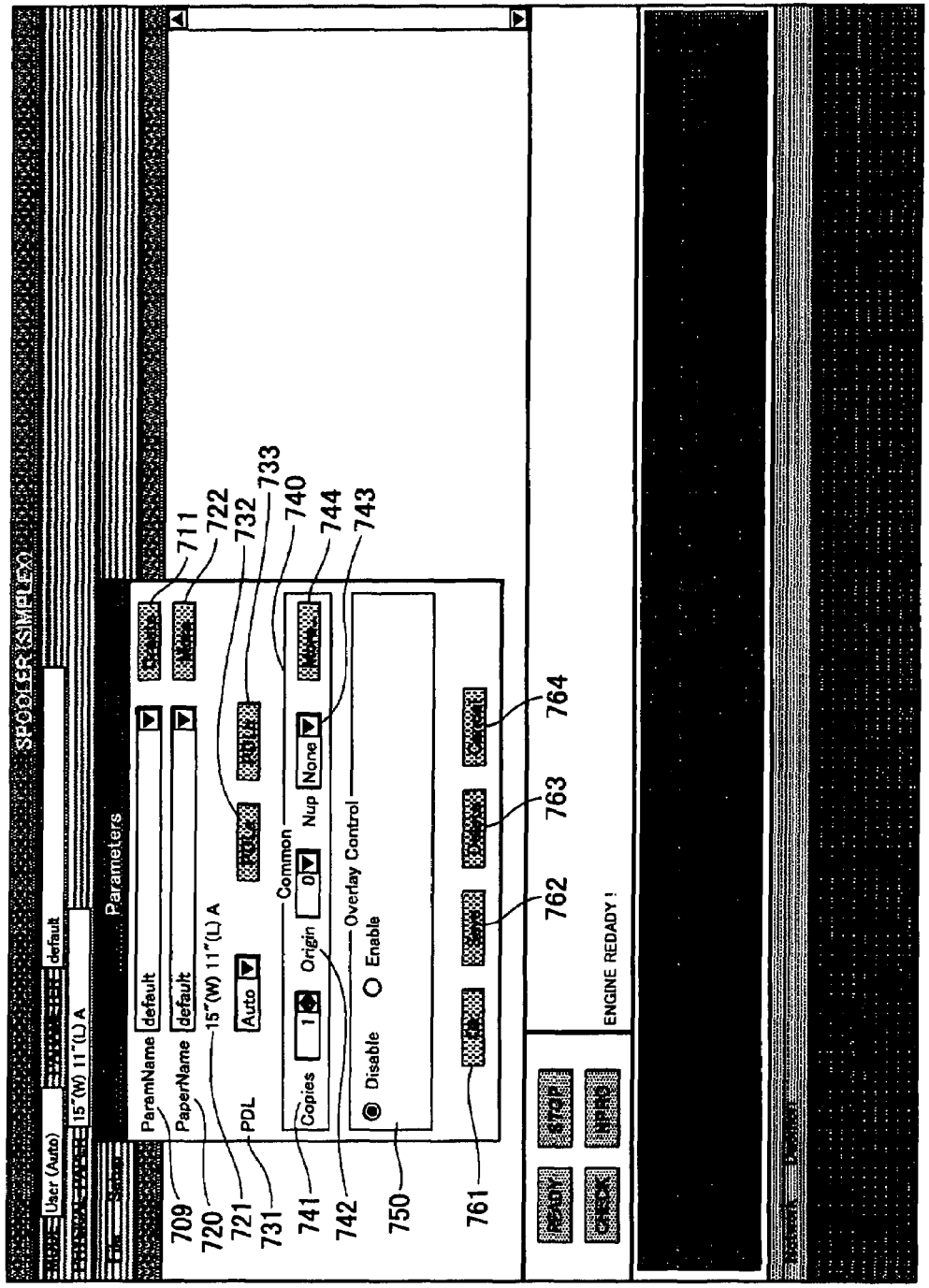
Figure 8:
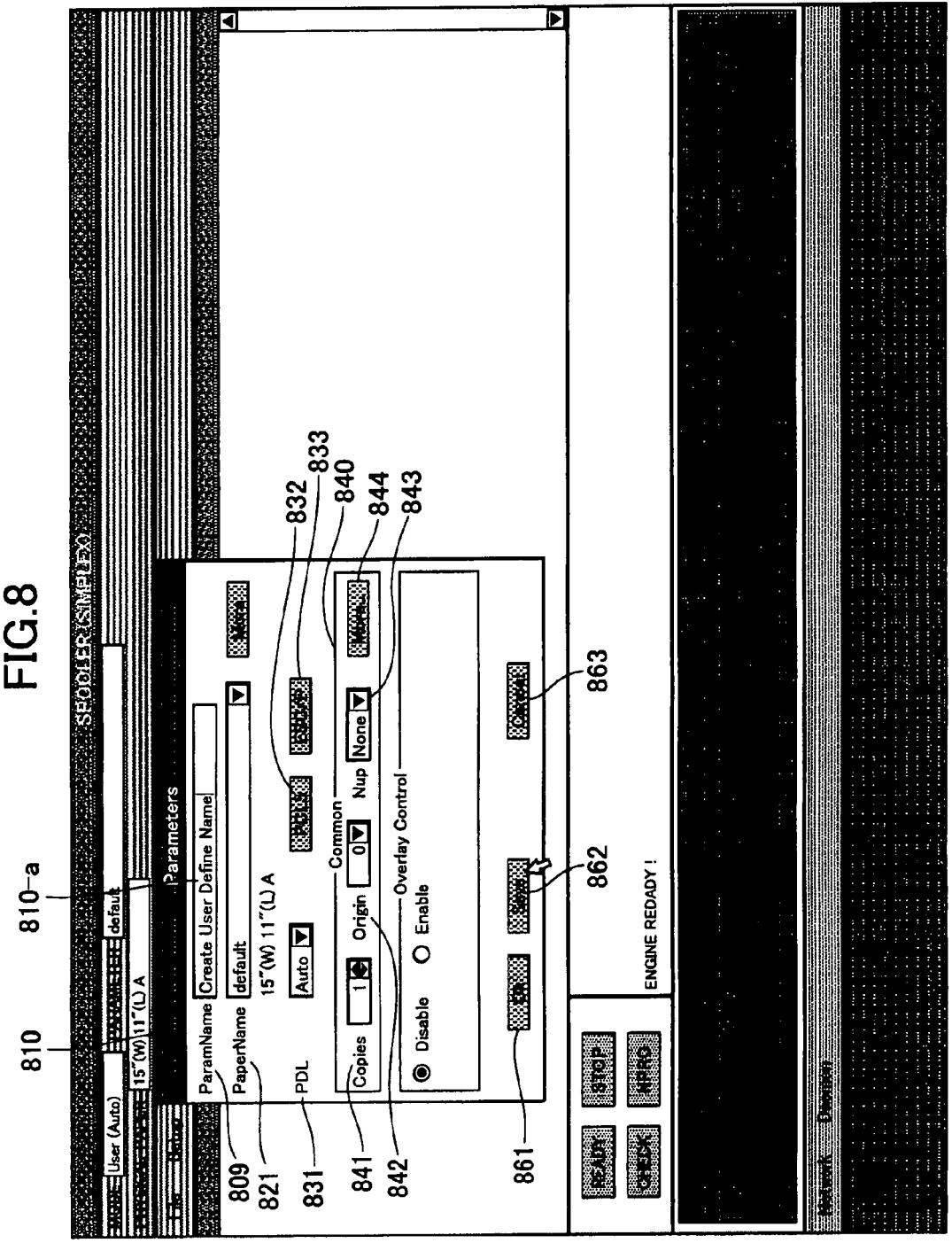
FIG. 8 is an explanatory diagram showing the user interface of the printer controller.

Next, the Parameter pull-down menu 623 that is a feature of the present invention will be described using FIGS. 7A, 7B, and 8. A Parameter group pull-down list 709 displays a list of parameter groups that have already been recorded, as shown in FIG. 7B (712, 713, 714, 715, and 716 in the example of FIG. 7B). The user can indicate and select a desired parameter group from this list. In this example, 714 is selected.

When the user wishes to define and record a new parameter group, the user clicks on a Create button 711, as shown in FIGS. 7A and 7B. In response, the window shown in FIG. 8 is displayed. In the window of FIG. 8, the user inputs a name in a Parameter Name space 809 to be attached to the parameter group. In FIG. 8, a name created by the user (810-*a*) is to be entered in Parameter Name space 809. Here the parameter group is named Create User Define Name 810-*a*. In FIG. 8, the user defines each parameter in the new parameter group as follows.

(1) A PaperName pull-down list 821 is set to "default";
(2) A PDL pull-down list 831 is set to "Auto";
(3) A PDLa parameter 832;
(4) A PDLb parameter 833;
(5) A Common area 840 allows common parameters independent of PDL to be set as follows.
(5-1) A Copies selection 841 indicating the number of copies to print is set to "1"
(5-2) An Origin pull-down list 842 indicating rotation is set to "0" degrees
(5-3) An Nup pull-down list 843 indicating how many pages to print on a physical sheet is set to "None"
(6) An Overlay Control selection 750 (see FIG. 7A) is set to "Disable"

To record the new parameter group with the above settings in a file under the name given in place of "Create User Define Name," the user clicks on a Save button 862. The user clicks on an OK button 861 when the user wishes to temporarily record the above settings to be saved until the power of the printer is turned off. If the user wishes to cancel the above settings, the user clicks on a Cancel button 863.

The Overlay Control selection 750 described in item (6) above, will be described later with reference to FIGS. 16-18.

By setting the rotational angle origin, the drawing unit 2300 rotates data drawn in the page buffer memory unit 2400 as the logical paper size exactly the angle specified by the Origin pull-down list 842. Here the Origin can be set to 0, 90, 180, or 270 degrees.

N-up is a function for arranging N logical pages on a physical page to instruct the drawing unit 2300 to draw pages at the logical paper size within the physical paper size. Here, 2, 3, 4, and other numbers have been provided as selections for N-up, but it is possible to achieve the same effects with other numbers. When N is 2 or 3, two or three logical pages are arranged horizontally within the physical paper. By doing this, the performance of printing logical sheets of paper can be improved two or three times the performance of the mechanism in the printer engine 500. The N-up function can be achieved by providing independent physical and logical paper sizes.

Figure 9A:
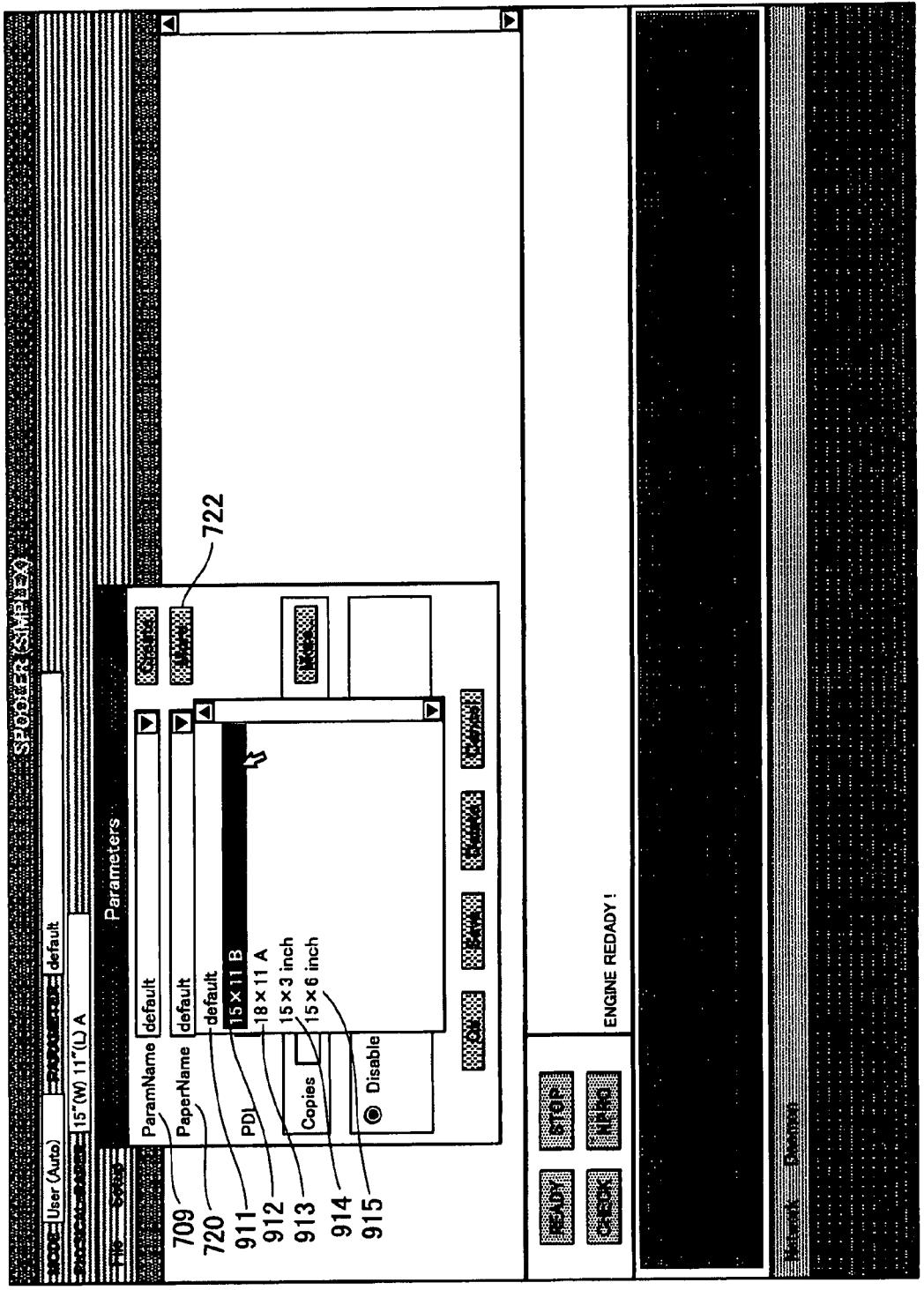

Next, the selection, definition, and entry of a PaperName pull-down list 720 will be described with reference to FIGS. 9A, 9B, and 9C. As shown in FIG. 9A, the PaperName pull-down list 720 displays a list of paper types that have already been recorded. This example includes paper types 911-915.

The user can select one of these paper names by indicating a desired parameter group (here, 912 has been selected). When the user wishes to define and record new paper sizes, the user clicks the More button 722 in FIG. 9A to display the window shown in FIG. 9B. In the window of FIG. 9B, the user inputs a name to be attached to the new paper size in a Name space 921. Here, "User Define Paper Name" has been inputted into the Name space 921. In FIG. 9B, the user defines the parameters for this new paper, as described below.

(1) A Width pull down list 922 indicating the paper width has been set to 15 inches.

(2) A Length pull-down list 923 indicating the paper length has been set to 11 inches.

(3) A Weight pull-down list 924 indicating the paper ream weight has been set to A.

In order to record the new paper name having the above specification in a file under the name "User Define Paper Name," the user clicks on a Save button 931. When the user wishes to cancel the above settings, the user clicks on an Exit button 932. Here, the defined paper size is the size for the physical paper described above, that is, the paper provided on the printer engine 500.

Figure 9B:
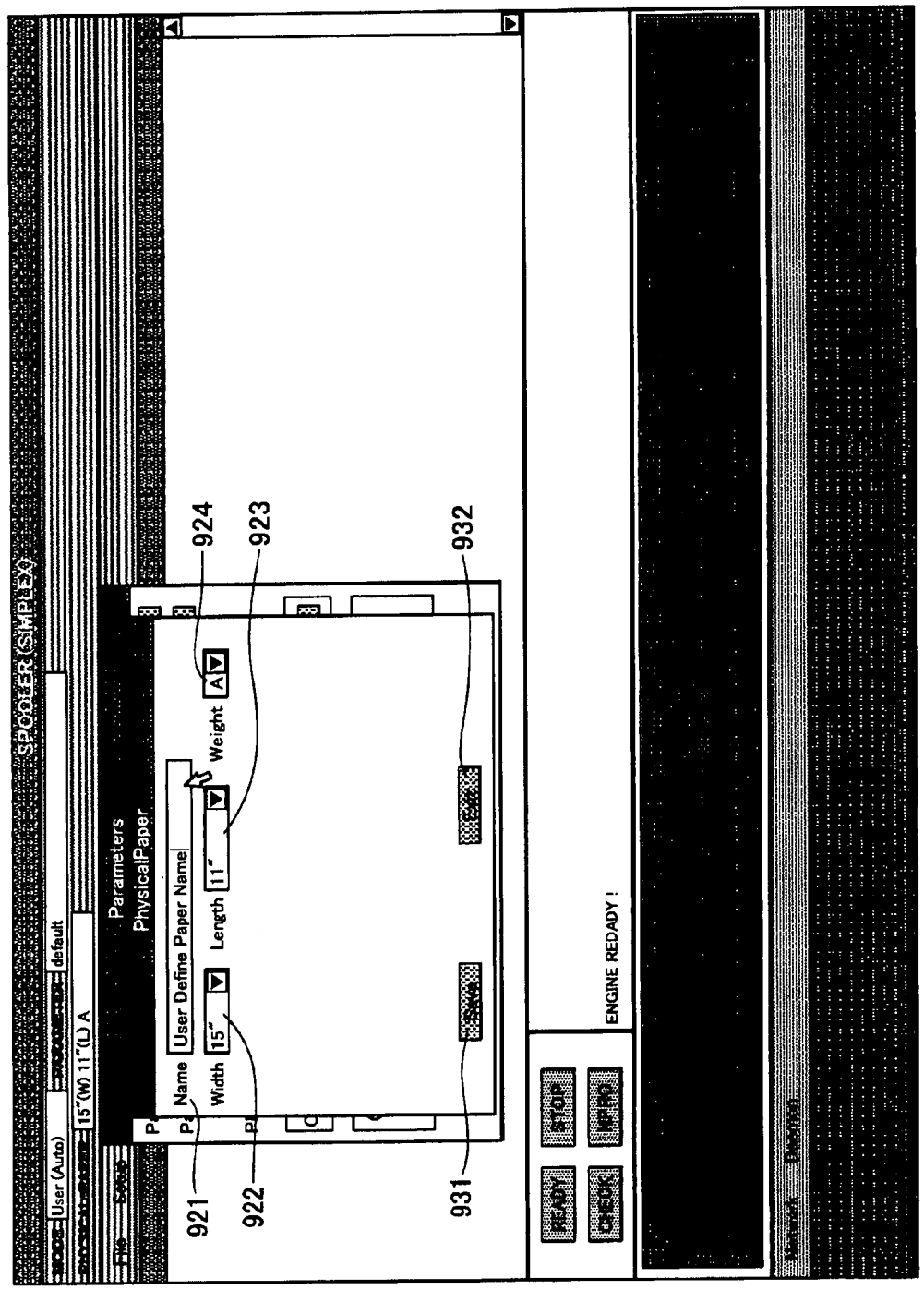

FIG. 9C shows the window displayed when the user selects the Width pull-down list 922 in FIG. 9B. The printer controller 200 displays candidates for paper width 922-*c* in the window, enabling the user to select an appropriate width.

Next, settings related to PDL in the parameter groups will be described with reference to FIG. 10A. The user sets the mode in a PDL pull-down list 731 to a PDL identification mode to be used in identifying PDL documents. Selections in the PDL pull-down list 731 include "Auto," "PDLa," and "PDLb." In this example, the printer controller 200 supports two types of PDL: PDLa and PDLb. In the Auto setting, the printer controller 200 analyzes print data received by the drawing unit 2300 and automatically determines whether the type of PDL is PDLa or PDLb. After identification, the drawing unit 2300 executes a process suited to the identified type of PDL.

When the PDL pull-down list 731 is set to PDLa, the drawing unit 2300 assumes that print commands are described in PDLa and performs a process designed for PDLa. When the PDL pull-down list 731 is set to PDLb, the drawing unit 2300 assumes that print commands are described in PDLb and performs a process designed for PDLb.

Figure 10A:
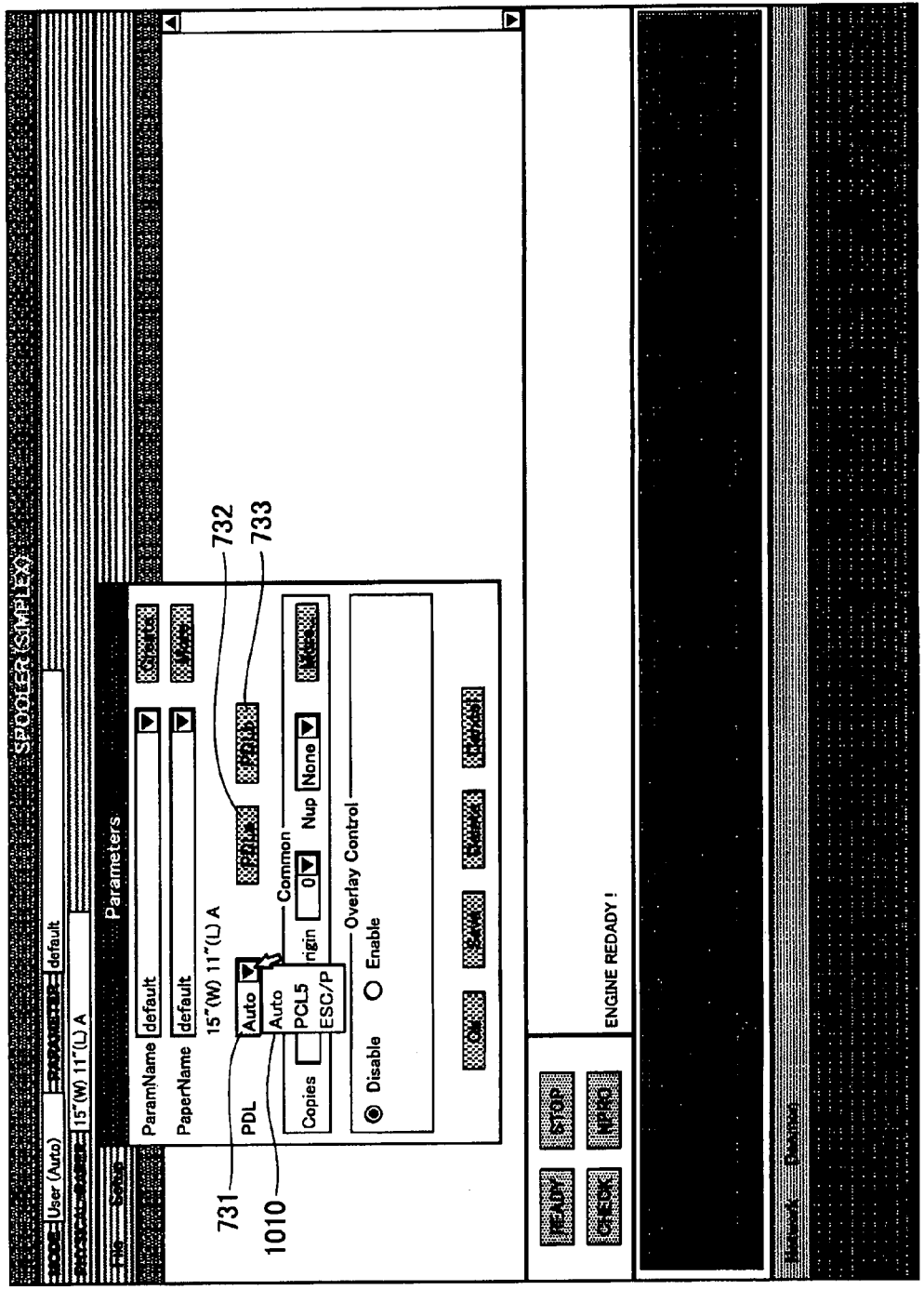
FIGS. 10A and 10B are explanatory diagrams showing the user interface of the printer controller.
Figure 10B:
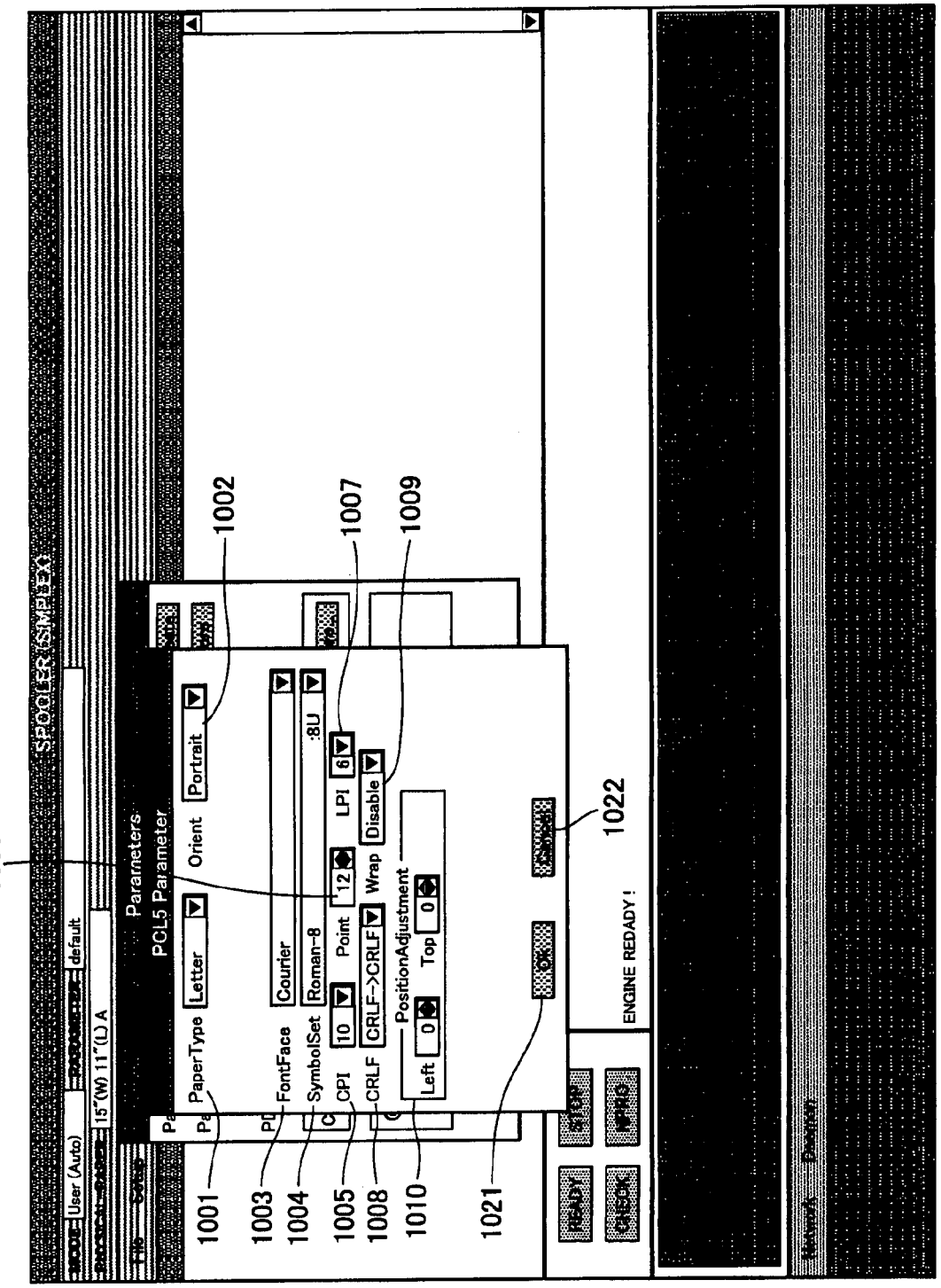

When the user clicks on a PDLa button 732 shown in FIG. 10A, a sub window of setting PDL parameters is displayed, as shown in FIG. 10B. The user can set the following specifications in the sub window.

(1) A PaperType pull-down list 1001 for setting the logical paper size (2) An Orient pull-down list 1002 for specifying the paper direction as either "Portrait" or "Landscape"

(3) A FontFace pull-down list 1003 for specifying the type of font (4) A SymbolSet pull-down list 1004 for specifying the symbol set (5) A CPI pull-down list 1005 for specifying the characters per inch (6) A Point pull-down list 1006 for specifying the character size in points (7) An LPI pull-down list 1007 for specifying the lines per inch (8) A CRLF pull-down list 1008 for setting the detailed significance of the carriage return/line feed code according to the user's wishes (9) A Wrap pull-down list 1009 for specifying whether to use a wraparound function. Here, setting the Wrap pull-down list 1009 to "Enable," automatically inserts a carriage return code, even when one does not exist, when a text line reaches the right edge of the page (normally specified by the right margin), causing the subsequent text to return to the left edge (normally specified by the left margin).

(10) Position adjustment settings 1010 for setting a reference point of origin for the paper in the vertical and horizontal directions for PDLa. More specifically, the Position adjustment settings 1010 is configured of two parameters: Left for the horizontal direction and Top for the vertical direction.

Settings are enabled by clicking on an OK button 1021 or canceled by clicking on a Cancel button 1022.

Figure 11:
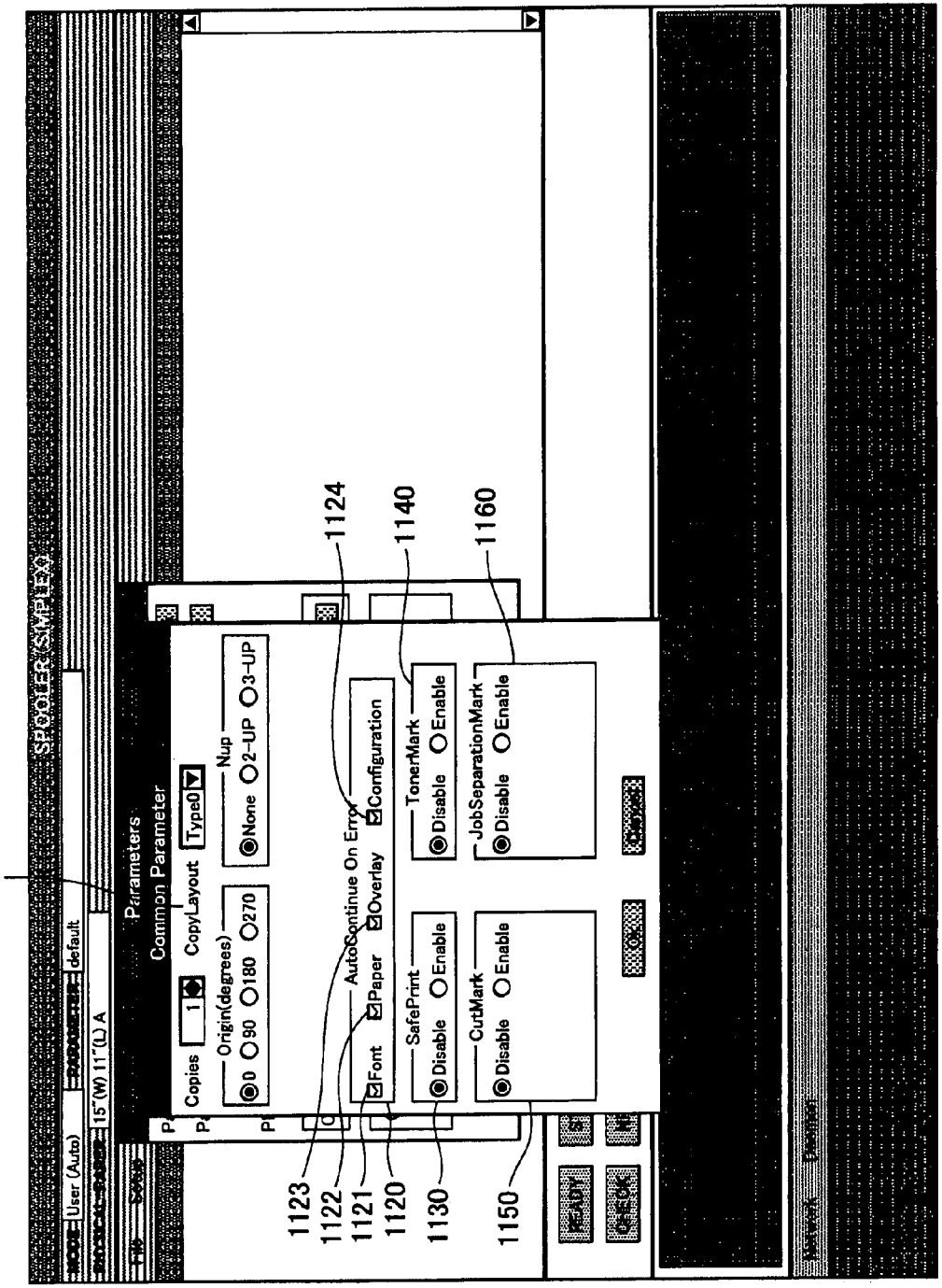
FIG. 11 is an explanatory diagram showing the user interface of the printer controller.

Next, the process for setting common parameters independent of the PDL will be described with reference to FIGS. 7 and 11. A Common sub area 740 shown in FIG. 7A is used to set these common parameters. In the Common sub area 740, the number of copies is set in a Copies setting 741, the angle of rotation is set in an Origin pull-down list 742, and N-up indication is set in an N-up pull-down list 743. To set additional common parameters other than the 741-743, the user clicks on a More button 744 to display the sub window shown in FIG. 11. Specifically, the following settings can be made in the sub window of FIG. 11.

(1) A Copy Layout pull-down list 1111;

(2) An Auto Continue on Error setting area 1120 for setting whether the printer controller 200 should automatically continue processing or not when an error, such as an out of resources error, is generated;

(3) A Safe Print selection 1130 for specifying whether to perform a process called Safe Print;

(4) A Toner Mark selection 1140 for indicating that toner marks should be printed:

(5) A Cut Mark selection 1150 for indicating that cut marks should be printed; and (6) A Job Separation Mark selection 1160 for indicating that job separation marks should be printed.

Next, the steps in the processes performed by the primary components of the printer controller 200 will be described with reference to FIGS. 12-15.

Figure 12:
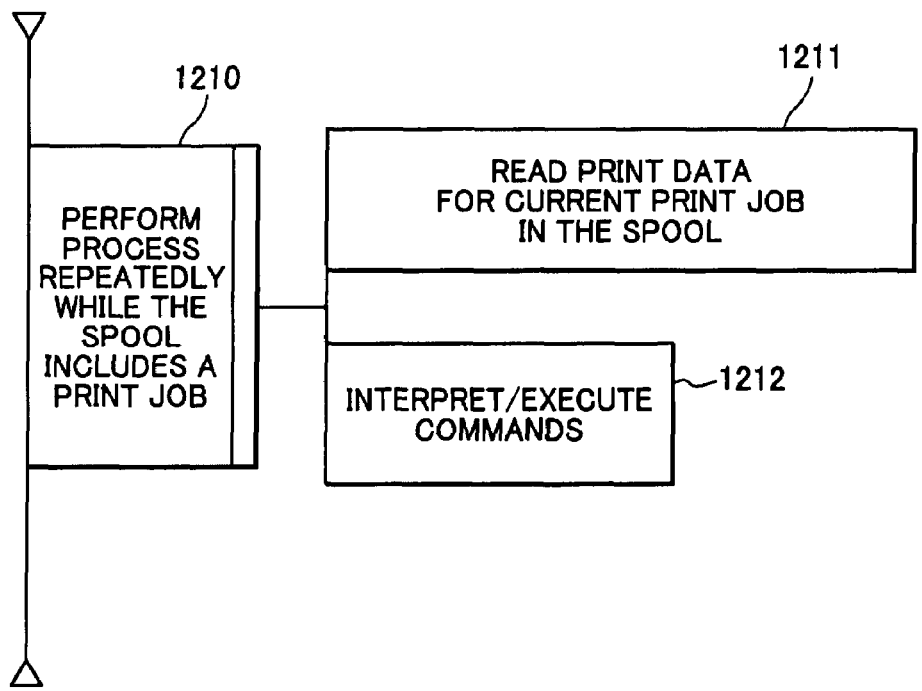
FIG. 12 is a flowchart showing steps in a process executed by the drawing unit.

First, a process performed by the drawing unit 2300 will be described with reference to FIG. 12. In step 1210, the drawing unit 2300 determines whether the spool 2100 stores a print job and repeatedly performs the following processes if a print job exists.

(1) In step 1211, the drawing unit 2300 reads print data corresponding to a print job from the spool 2100. The reading process is performed by the spool reading unit 2120.

(2) In step 1212 a command interpreting/executing unit interprets the content of the print data and draws dot image data in the page buffer memory unit 2400 in units of pages.

Figure 13:
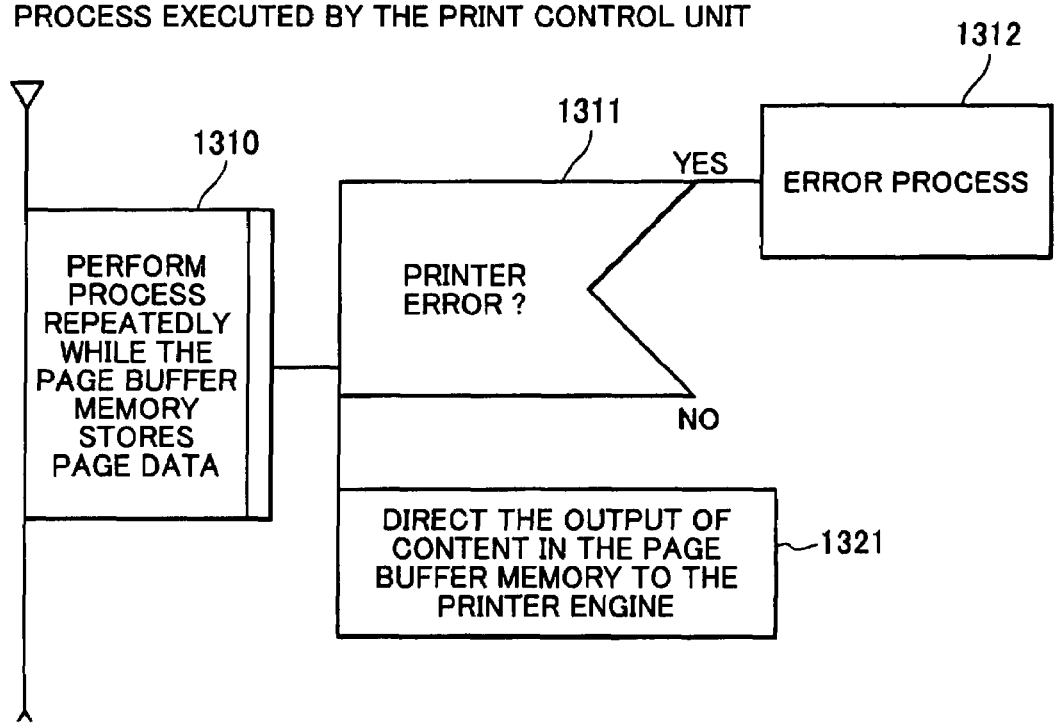
FIG. 13 is a flowchart showing steps in a process executed by the print control unit.

Next, a process executed by the print control unit 2500 will be described with reference to FIG. 13. In step 1310, the print control unit 2500 determines whether the page buffer memory unit 2400 stores page data and repeatedly performs the following steps as long as page data exists in the page buffer memory unit 2400.

(1) In step 1311, the print control unit 2500 checks whether an error has been generated in the printer engine 500. If an error has been generated, then an error process corresponding to the error generated is executed in step 1312.

(2) In step 1321, the print control unit 2500 instructs the engine control unit 2550 to output page data from the page buffer memory unit 2400 to the printer engine 500.

Figure 14:
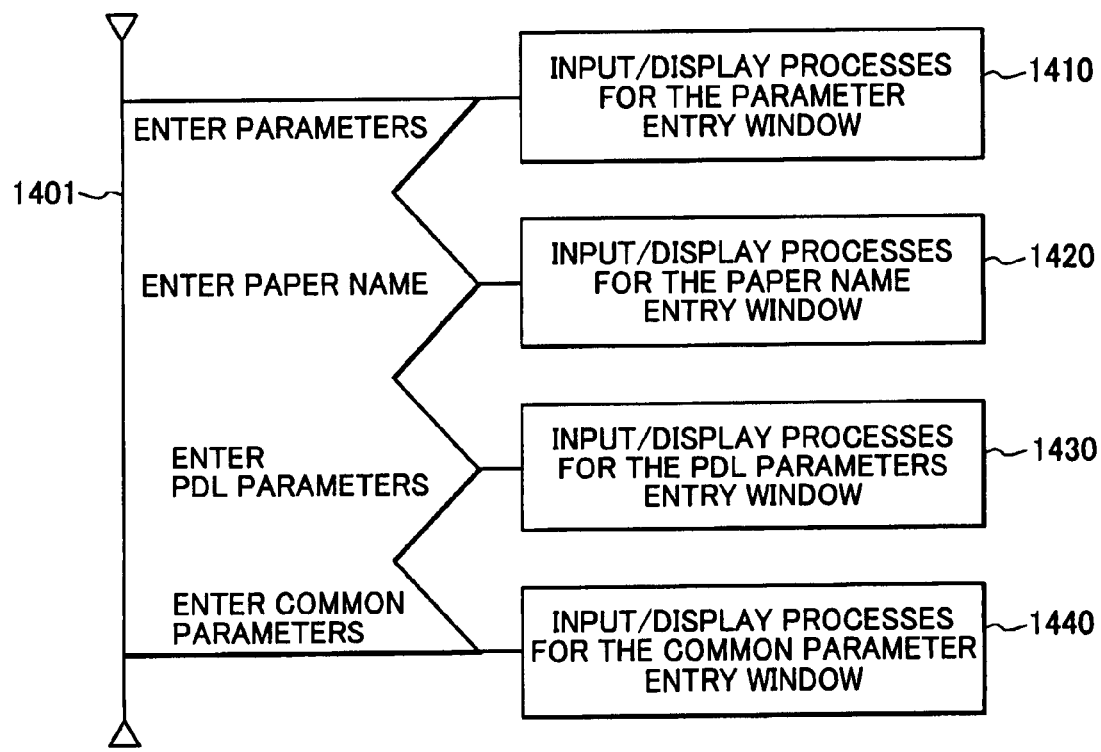
FIG. 14 is a flowchart showing steps in an input interrupt process executed by the user interface control unit.

Next, an input interrupt process executed by the user interface control unit 2600 will be described with reference to FIG. 14. Here, the processes indicated in step 1401 are executed based on the input content.

(1) When directed to record parameters, the user interface control unit 2600 performs an input process and display process in step 1410 for a parameter input window. The windows shown in FIGS. 7A, 7B, and 8 described above correspond to the process of step 1410.

(2) When directed to record a paper name, the user interface control unit 2600 performs an input process and display process in step 1420 for a paper name entry window. Here, the windows shown in FIGS. 9A, 9B, and 9C described above correspond to the process of step 1420.

(3) When directed to record PDL related parameters, the user interface control unit 2600 performs an input process and display process in step 1430 for a PDL parameters entry window. The windows shown in FIGS. 10A and 10B described above correspond to the process of step 1430.

(4) When directed to record common parameters, the user interface control unit 2600 performs an input process and display process in step 1440 for a common parameter entry window. The window of FIG. 11 described above corresponds to the process of step 1440.

Figure 15:
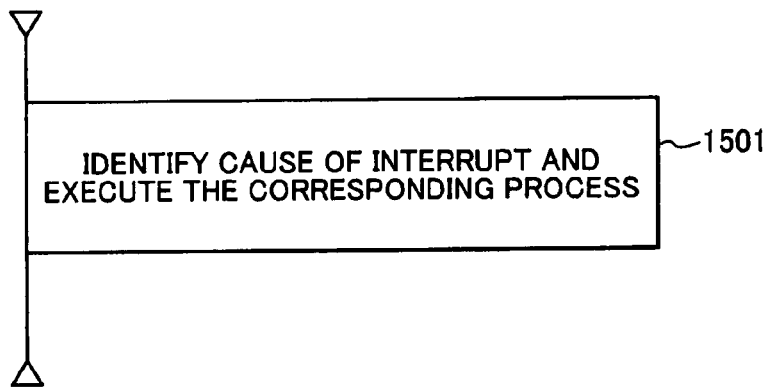
FIG. 15 is a flowchart showing steps in an engine interrupt process executed by the engine control unit.

FIG. 15 shows the steps in an engine interrupt process executed by the engine control unit 2550. In step 1501, the engine control unit 2550 identifies the cause of the interrupt generated by the printer engine 500 and executes a process corresponding to the cause.

Next, an overlay printing process according to the present invention and parameters related to this process will be described with reference to FIGS. 16-18.

Figure 16A:
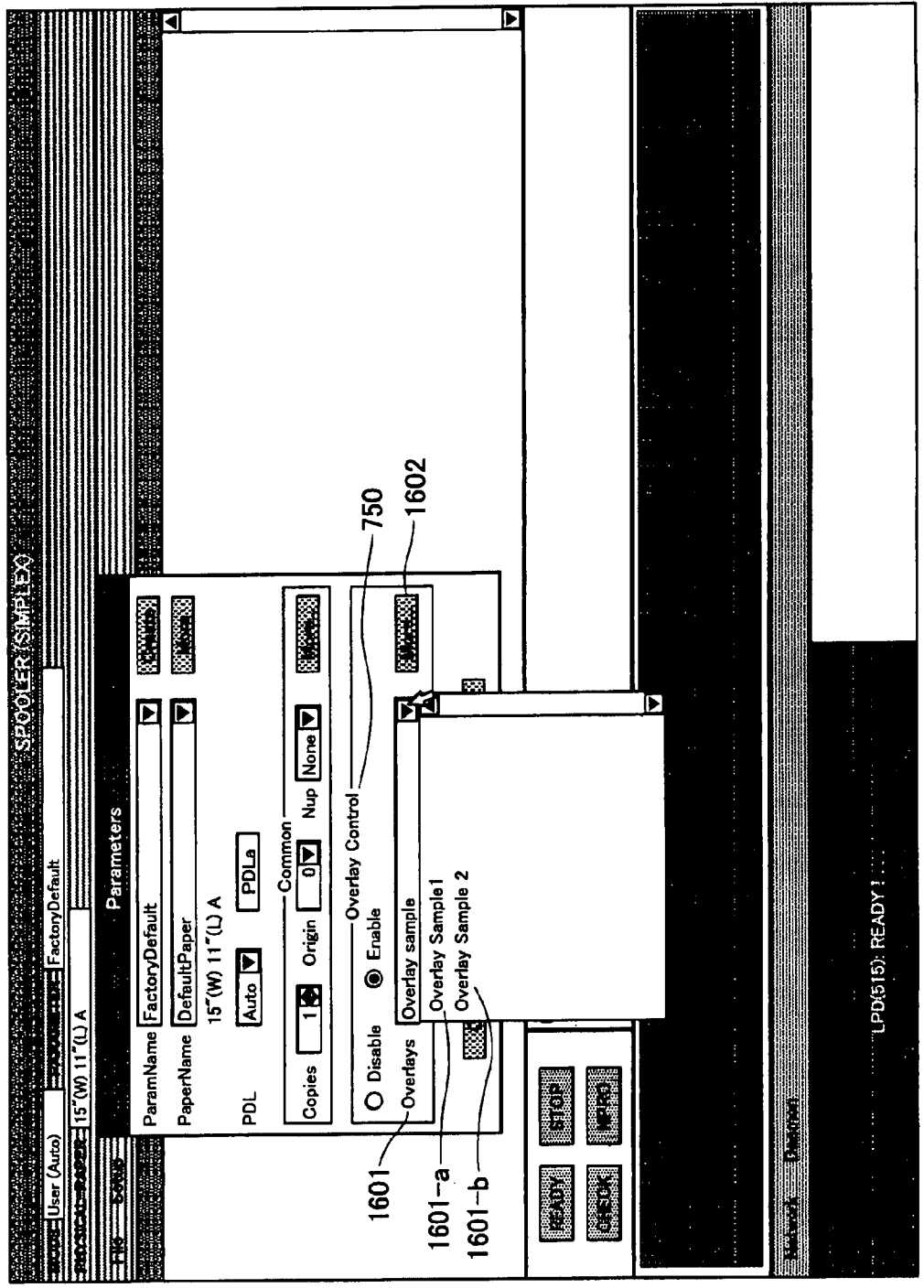
FIGS. 16A through 16C are explanatory diagrams showing overlay control settings.

As shown in FIG. 16A, the user has set an Overlay Control selection 750 to "Enable." The user can display an Overlays pull-down list 1601 to list previously entered overlays, such as Overlay Sample1 1601-*a* and Overlay Sample2 1601-*b*. In this example, the user selects the Overlay Sample1 1601-*a* from the list by clicking on the selection.

Figure 16B:
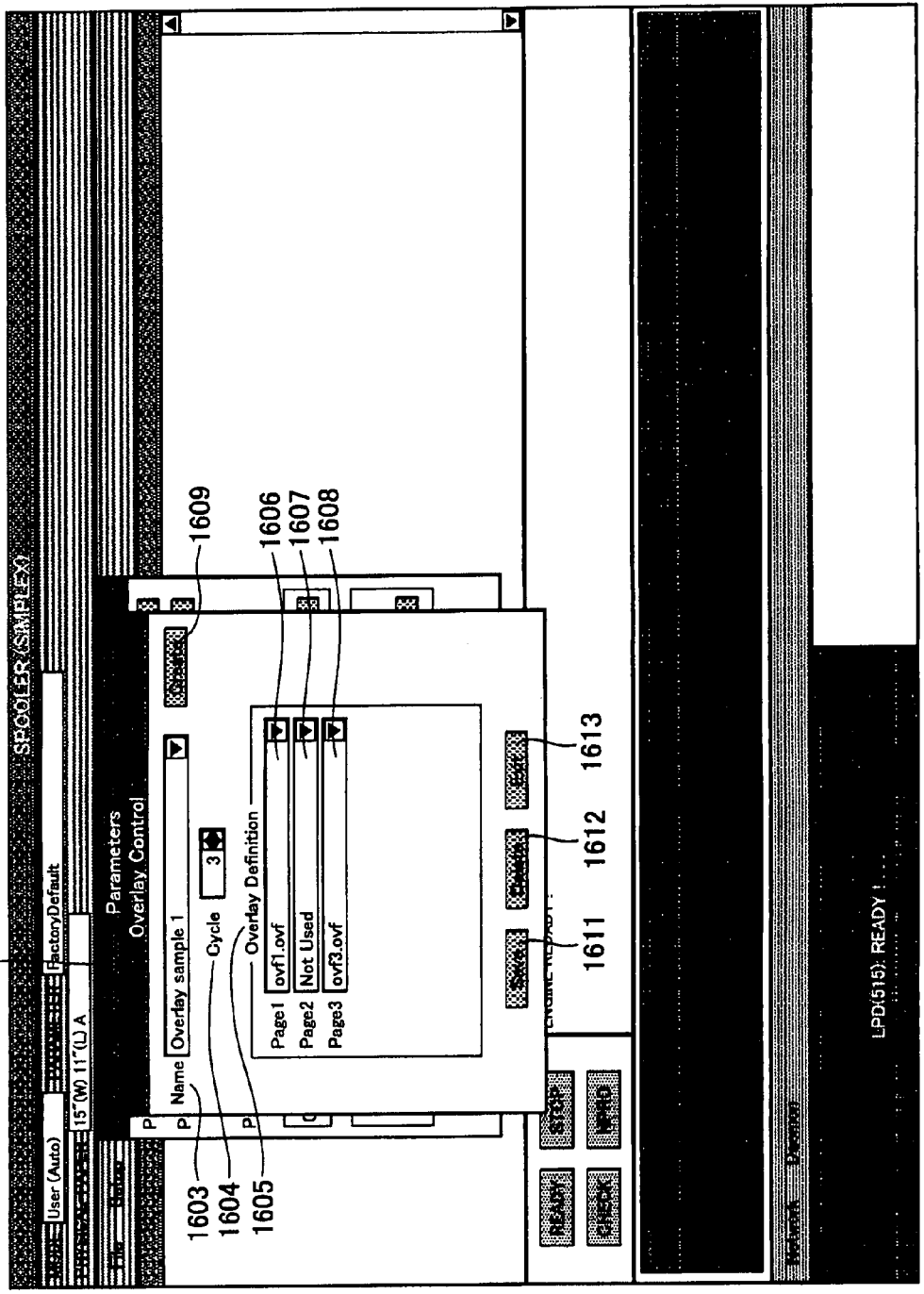

By clicking on a More button 1602 in FIG. 16A, the user can display a sub window shown in FIG. 16B. The user can confirm the content of the selected Overlay Sample1 1601-*a* in this sub window.

In this example, the name of the selected Overlay Sample1 1601-*a* is displayed in a Name area 1603 as "Overlay Sample1." The content of the selected Overlay Sample1 1601-*a* is described in a Cycle setting 1604 and an Overlay Definition area 1605. In this example, overlay data ovf1.ovf 1606 will be printed for the first page of the print job, no overlay data (1607) will be printed for the second page, and overlay data ovf3.ovf 1608 will be printed on the third page. These pages will be cycled three times during the print, as set in the Cycle setting 1604. According to the Cycle setting 1604, the overlay data ovf1.ovf 1606 will be printed on the fourth page of the print job; no overlay data (1607) will be printed on the fifth page; the overlay data ovf3.ovf 1608 will be printed on the sixth page; the overlay data ovf1.ovf 1606 will be printed on the seventh page of the print job; no overlay data (1607) will be printed on the eighth page; and the overlay data ovf3.ovf 1608 will be printed on the ninth page.

In other words, the Cycle setting 1604 indicates the number of times to repeat the Overlay Definition area 1605.

The Overlay Definition area 1605 indicates overlay data used in the print job on the first page, second page, . . . .

Figure 16C:
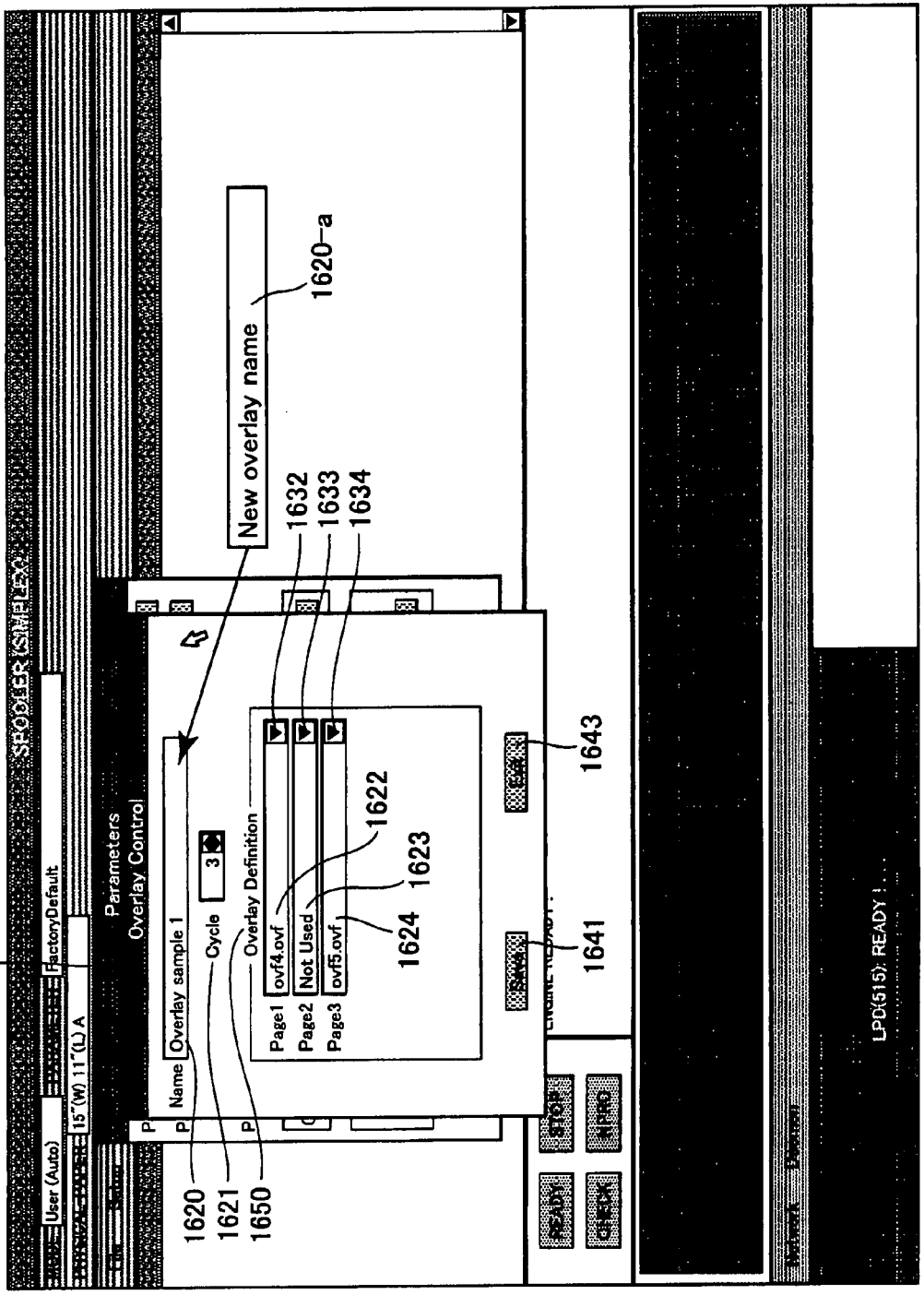

When defining and entering new overlays, the user clicks on a Create button 1609 shown in FIG. 16B to display the sub window shown in FIG. 16C.

In the window of FIG. 16C, the user inputs a name to be assigned to the new overlay in a Name area 1620. Here, the user inputs a New Overlay name 1620-*a*. The user defines the following settings for this overlay in FIG. 16C.

(1) A Cycle setting 1621 is set to "3"

(2) An Overlay Definition area 1650 is set such that: the overlay data for page 1 is ovf4.ovf 1622, the overlay data for page 2 is Not used 1623, and the overlay data for page 3 is ovf5.ovf 1624.

Here, the user specifies overlay data for pages 1, 2, and 3 by opening pull-down lists 1632, 1633, 1634, respectively and selecting desired overlay data from each list.

The user clicks on a Save button 1641 to enter the overlay data having the above settings in a file with the name New overlay name 1620-*a*. If the user wishes to cancel the overlay entry process, the user clicks on an Exit button 1643.

Next, a Save button 1611, a Delete button 1612, and an Exit button 1613 will be described with reference to FIG. 16B. The Save button 1611 is used for saving modified overlay content under the overlay name shown in the Name area 1603 when modifying the Cycle setting 1604 or the Overlay Definition area 1605 for an existing Name area 1603. The Delete button 1612 is used for deleting a Name area 1603 that has already been recorded. The Exit button 1613 is used for returning to the above Parameter window, while ignoring any changes made by the user in FIG. 16B.

---

FIG. 16A

MODE  User (Auto)    PARAMETER   Factory Default
PHYSICAL-PAPER15"(W)11"(L)A
File Setup
          ParamName    FactoryDefault         Create
          PaperName    DefaultPaper           More
          15"(W)11"(L)A
PDL       Auto         PDLa
Copies 1       Origin 0          NUP    None   More
               Overlay Control   750
Disable Enable
1601 Overlays  Overlay sample          More 1602
               Overlay Sample 1        1601-a
               Overlay Sample 2        1601-b
READY         STOP
CHECK         NPRO              ENGINE READY!
Network Daemon
LPD(515): READY!

---

FIG. 16B

MODE  User (Auto)    PARAMETER   Factory Default
PHYSICAL-PAPER15"(W)11"(L)A
File Setup     Parameters
         Overlay Control    750
         Name    Overlay sample     Create    1609
         Overlay Definition     1605
         Page 1  ovf3.ovf       1606
         Page 2  Not Used       1607
         Page 3  ovf3.ovf       1608
         Save 1611   Delete 1612   Exit 1613
READY         STOP              ENGINE READY!
CHECK         NPRO              ENGINE READY!
Network Daemon
P MODE  User (Auto)   PARAMETER   Factory Default
PHYSICAL-PAPER15"(W)11"(L)A
File Setup
         Name    Overlay   sample 1     Create    1609
         Overlay Definition     1605
         Page 1  ovf1.ovf       1606
         Page 2  Not Used       1607
         Page 3  ovf3.ovf       1608
         Save 1611   Delete 1612   Exit 1613

-continued

FIG. 16B

| READY | STOP | |
|---|---|---|
| CHECK | NPRO | ENGINE READY! |
| LPD(515); READY! | | |

FIG. 16C

| MODE User (Auto) | PARAMETER | Factory Default |
|---|---|---|
| PHYSICAL-PAPER15"(W)11"(L)A | | |
| File Setup | Parameters | |
| 750 Overlay Control | | |
| 1620 Name Overlay | sample | |
| 1621 Cycle 3 | | New overlay name 1620-a |
| Overlay Definition | 1622 | |
| Page 1 ovf1.ovf | 1622 | |
| Page 2 Not Used | 1623 | |
| Page 3 ovt3.ovf | 1624 | |
| Save 1611 Delete 1612 Exit 1613 | | |
| READY | STOP | |
| CHECK | NPRO | ENGINE READY! |
| Network Baemon | | |
| LPD(515):READY! | | |

Next, a method for entering overlay data, such as the ovf1.ovf, ovf3.ovf, ovf4.ovf, ovf5.ovf, and the like will be described while referring to FIG. 17. However, other methods may also be used.

The printer of the present invention has a special printing mode called a manual mode. This manual mode can be set as a function within the Setup pull-down menu 622.

In the manual mode, the user can select a desired print job from the spool, that is, the printing queue window 630 and can indicate a desire to print the job while manually selecting various parameters for the job. FIG. 17 is a sub window for manually setting parameters. As shown in FIG. 17, a File-name area 1701 displays the filename of the print job selected by the user. A Filesize area 1702 displays the size of the print job file. A PDL selection 1703 indicates the PDL type for the print job. Here, the user can specify either Auto 1703-1, PDLa 1703-2, or the like. If Auto 1703-1 is specified, the printer interprets the print job and automatically identifies the PDL before printing. If PDLa 1703-2 is specified, the printer processes the PDL of the print job as PDLa. It is also possible to specify other types of PDL, such as PDLb. If PDLb 1703-2 is specified, the printer processes the PDL of the print job as PDLb.

A Copies selection 1704 sets the number of copies or the print job to print. A Pages to Print selection 1705 enables the user to specify whether to print All 1705-1 or Partial 1705-2. When the All 1705-1 is selected, the printer prints the entire job. When Partial 1705-2 is selected, the printer prints a portion of the print job. In order to specify which portion of the print job to print, the user can specify the beginning page and ending page in a separate window (not shown).

By checking a Delete after printed box 1706, the printer deletes the print job from the spool 2100 after printing the job. By unchecking the Delete after printed box 1706, the printer does not delete the print job from the spool 2100 after printing the job.

By checking a Save as Overlay box 1707, the printer prints the first page of the print job, and the printer controller 200 saves this printed page as overlay data. The name used when saving this entry is specified in an Overlay name space 1708.

In the example of FIG. 17, a name New Overlay name 1709 is entered in the Overlay name space 1708.

When the Pages to Print selection 1705 is set to the All 1705-1, the first page of the print job is saved as overlay data. When the Pages to Print selection 1705 is set to the Partial 1705-2, the print beginning page of the print job is saved as the overlay data.

The user clicks on an OK button 1710 to specify that the parameters set manually above are to be used when specifying a print in the manual mode. The user clicks on a Cancel button 1711 when the user has set parameters manually as described above, but wishes to quit the print in manual mode.

Next, a sample execution of a printing process using overlay will be described with reference to FIGS. 18A and 18B.

In this example, the user can specify a maximum of eight types of overlay data for each print job. The user can specify either a single entry of overlay data to be used on a page in the print lob, or can specify no overlay data. However, the maximum number of overlay types is not limited to eight.

If the user specifies eight types of overlay data, for example, the first overlay data through the eighth overlay data will be printed over the first page through the eighth page in order. Beginning from the ninth page of the print job, the first overlay data will be used again. Settings for overlaying data on a print job, as described above, can be specified by parameters related to the Overlay Control selection 750 described in FIGS. 16A-16C.

When the size of the overlay data is larger than the paper size, overlay data exceeding the paper size will be clipped out. In other words, this portion of the overlay data will not be printed.

In the parameters related to the Overlay Control selection 750 in the example of FIG. 18A, the Copies setting 741 is set to 1 (18a1) and the Cycle setting 1604 to 5 (18a2). The Overlay Definition area 1605 (18a3) is set to Overlay1 (18a3-1), Overlay3 (18a3-2), Overlay4 (18a3-3), Not used (18a3-4), and Overlay5 (18a3-5).

A print job 18a4 includes pages 1-6, wherein page 1 corresponds to 18a4-1 in FIG. 18A, page 2 corresponds to 18a4-2, page 3 corresponds to 18a4-3, page 4 corresponds to 18a4-4, page 5 corresponds to 18a4-5, and page 6 corresponds to 18a4-6.

If the Overlay Control selection 750 for this print job is set to "Enable" and the print job is printed according to parameters 18a1, 18a2, and 18a3 described above, then the print job will be printed as in a print result 18a5. That is, page 1 will be printed with Overlay1 (18a5-1), page 2 will be printed with Overlay3,(18a-2), page 3 will be printed with Overlay4 (18a5-3), page 4 will be printed alone without overlay (18a5-4), page 5 will be printed with Overlay5 (18a5-5), and page 6 will be printed with Overlay1 (18a5-6).

In the parameters related to the Overlay Control selection 750 in the example of FIG. 18B, the Copies setting 741 is set to 4 (18b1) and the Cycle setting 1604 to 5 (18b2). The Overlay Definition area 1605 (18b3) is set to Overlay1 (18b3-1). Overlay3 (18b3-2), Overlay4 (18b3-3), Not used (18b3-4), and Overlay5 (18b3-5).

A print job 18b4 includes pages 1-6, wherein page 1 corresponds to 18b4-1 in FIG. 18B, page 2 corresponds to 18b4-2, page 3 corresponds to 18b4-3, page 4 corresponds to 18b4-4, page 5 corresponds to 18b4-5, and page 6 corresponds to 18b4-6.

If the Overlay Control selection 750 for this print job is set to "Enable" and the print job is printed according to parameters 18b1, 18b2, and 18b3 described above, then the print job will be printed as in a print result 18b5.

In the present invention, the user can pre-record a series of parameter groups corresponding to a print job using the user interface functions. The user can select a group of parameters at once from the pre-recorded parameters groups to correspond to the next print job. In this way, the present invention can reduce the operations required by the user to select parameters.

In the present invention, it is possible to include and record parameters related to overlay printing in the series of parameter groups, thereby further facilitating operations by the user.

The same effects of the present invention can be achieved in the following cases.

(1) When the display 442 and operation panel 470 are integrated in one unit, (2) When using a touch panel, rather than a keyboard and mouse, as a device for inputting data into the printer controller, and (3) When a computer sends PDL format files managed by the computer directly to the printer controller, and the printer controller prints the file.

What is claimed is:

1. A printer comprising:
   a printer controller that receives a PDL document from a computer and generates image data based on the PDL document, the printer controller including a user interface control unit for allowing a user to set all parameters relating to a paper to be printed and to record a group of parameters with a paper name identifying the paper to be printed;
   means for recording a parameter group that includes a PDL identification mode, parameters for each type of PDL, and the paper name with a parameter name identifying the parameter group; and
   a printer engine that receives the image data from the printer controller and prints images based on the image data.

2. The printer according to claim 1, wherein the group of parameters includes parameters relating to paper size, paper thickness, and fixing temperature.

3. The printer according to claim 1, wherein when a plurality or parameter groups are recorded, the user can select one of the plurality of parameter groups by specifying a corresponding paper name in order to set all parameters in the printer controller when a paper identified by the corresponding paper name is used.

4. The printer according to claim 1, wherein the group of parameters includes common parameters independent of PDL.

5. The printer according to claim 4, wherein the common parameters include a number of print copies, a rotational angle, and an N-up parameter.

6. A printer comprising:
   a printer controller that receives a PDL document from a computer and generates image data based on the PDL document, the printer controller including a user interface control unit for allowing a user to set all parameters relating to an overlay printing and to record a group of parameters with an overlay name identifying the overlay printing;
   means for recording a parameter group that includes a PDL identification mode, parameters for each type of PDL, and the paper name with a parameter name identifying the parameter group; and
   a printer engine that receives the image data from the printer controller and prints images based on the image data.

7. A printer comprising:
   a printer controller that receives a PDL document from a computer and generates image data based on the PDL document, the printer controller including a user interface control unit for allowing a user to set all parameters relating to a paper to be printed and record a first group of parameters with a paper name identifying the paper to be used, and to set all parameters relating to an overlay printing and record a second group of parameters with an overlay name identifying the overlay printing;
   means for recording a parameter group that includes a PDL identification mode, parameters for each type of PDL, and the paper name with a parameter name identifying the parameter group; and
   a printer engine that receives the image data from the printer controller and prints images based on the image date.

8. The printer according to claim 7, wherein when a plurality of parameter groups are recorded, the user can select one of the plurality of parameter groups by specifying a corresponding paper name in order to set all parameters in the printer controller when a paper identified by the corresponding paper name is used.

9. The printer according to claim 7, wherein the group of parameters includes common parameters independent of PDL.

10. The printer according to claim 7, wherein the common parameters include a number of print copies, a rotational angle, and an N-up parameter.

11. A printer comprising:
    a printer controller that receives a PDL document from a computer and generates image data based on the PDL document, the printer controller including a user interface control unit for allowing a user to set all parameters relating to a paper to be printed and record a first group of parameters with a paper name identifying the paper to be printed, to set all parameters relating to an overlay printing and record a second group of parameters with an overlay name identifying the overlay printing, and to set a third group of parameters including a PDL identification mode and parameters for each type of PDL and record the third group of parameters with a parameter name identifying the third group of parameter; and
    a printer engine that receives the image data from the printer controller and prints images based on the image data.

12. The printer according to claim 11, wherein the first group of parameters includes parameters relating to paper size, paper thickness, and fixing temperature.

13. The printer according to claim 11, wherein when a plurality of first parameter groups are recorded, the user can select one of the plurality of first parameter groups by specifying a corresponding paper name in order to set all parameters in the printer controller when a paper identified by the corresponding paper name is used.

14. The printer according to claim 11, wherein the first group of parameters includes common parameters independent of PDL.

15. The printer according to claim 14, wherein the common parameters include a number of print copies, a rotational angle, and an N-up parameter.

* * * * *

UNITED STATES PATENT AND TRADEMARK OFFICE
Certificate

Patent No. 7,400,420 B2            Patented: July 15, 2008

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Seiji Kageyama, Hitachinaka (JP); Susumu Hashimoto, Hitachinaka (JP); Muneyoshi Akai, Hitachinaka (JP); Shinichi Kishi, Hitachinaka (JP); Hiroshi Udo, Hitachinaka (JP); Toshihiko Takenouchi, Hitachinaka (JP); and Noboru Aoki, Hitachinaka (JP).

Signed and Sealed this Thirteenth Day of September 2011.

WELLINGTON CHIN
*Supervisory Patent Examiner*
Art Unit 2600
Technology Center 2600